United States Patent
Harley et al.

(10) Patent No.: US 7,047,268 B2
(45) Date of Patent: May 16, 2006

(54) ADDRESS GENERATORS FOR MAPPING ARRAYS IN BIT REVERSED ORDER

(75) Inventors: Thomas Harley, Germantown, MD (US); Giriyapura Panchaksharaiah Maheshwaramurthy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 643 days.

(21) Appl. No.: 10/097,407

(22) Filed: Mar. 15, 2002

(65) Prior Publication Data

US 2003/0200414 A1  Oct. 23, 2003

(51) Int. Cl.
*G06F 7/14* (2006.01)

(52) U.S. Cl. .................. 708/404; 708/400
(58) Field of Classification Search ........... 708/404, 708/400; 711/211
See application file for complete search history.

(56) References Cited

U.S. PATENT DOCUMENTS

| | | | |
|---|---|---|---|
| 3,673,399 A | 6/1972 | Hancke et al. ............ 235/156 |
| 4,547,862 A | 10/1985 | McIver et al. ............ 364/726 |
| H570 H * | 1/1989 | Tylaska et al. ............ 708/200 |
| 4,823,297 A | 4/1989 | Evans ....................... 364/725 |
| 4,916,649 A | 4/1990 | Yorozu et al. ............ 364/726 |
| 4,977,533 A | 12/1990 | Miyabayashi et al. ...... 364/726 |
| 5,329,474 A | 7/1994 | Yamada .................... 364/726 |
| 5,473,556 A | 12/1995 | Aguilar et al. ........... 364/726 |
| 5,682,340 A | 10/1997 | Arends et al. ......... 364/715.08 |
| 6,035,313 A | 3/2000 | Marchant .................. 708/404 |
| 6,247,034 B1 | 6/2001 | Nakai et al. .............. 708/409 |
| 6,279,096 B1 | 8/2001 | McCoy et al. ............ 711/211 |
| 6,304,887 B1 * | 10/2001 | Ju et al. .................. 708/404 |
| 6,351,758 B1 * | 2/2002 | Courtney et al. .......... 708/404 |
| 6,366,937 B1 * | 4/2002 | Shridhar et al. .......... 708/409 |
| 6,430,587 B1 * | 8/2002 | Orling ...................... 708/404 |
| 6,609,140 B1 * | 8/2003 | Greene .................... 708/404 |
| 6,643,761 B1 * | 11/2003 | Berg et al. ............... 711/220 |
| 6,789,097 B1 * | 9/2004 | Jin ........................... 708/400 |
| 2002/0194235 A1* | 12/2002 | Yamamoto et al. ....... 708/403 |
| 2003/0131032 A1* | 7/2003 | Vinitzky .................. 708/404 |

OTHER PUBLICATIONS

J.W. Cooley and J.W. Tukey, An Algorithm for the Machine Calculation of Complex Fourier Series, Mathematics of Computationn (1965), vol. 19, No. 90, pp. 297-301.

* cited by examiner

*Primary Examiner*—Tan V. Mai
(74) *Attorney, Agent, or Firm*—Abdul Zindani; Wade James Brady, III; Frederick J. Telecky, Jr.

(57) ABSTRACT

A method and apparatus to reduce the amount of required memory and instruction cycles when implementing Fast Fourier Transforms (FFTs) on a computer system is described. The invention optimizes FFT software using in-place bit reversal (IPBR) implemented on a processor capable of bit reversed incrementation. Alternative embodiments implement the invention for out of place bit reversal (OOPBR) and on processors that do not support special instructions for bit reversed incrementation. The invention only generates unique bit-reversed address pairs and avoids generation of self-reversed addresses. To optimize the invention for in place bit reversal, every non-self bit reversed address in the input array is generated only once, while making simple, computationally efficient increments away from the previous pair of bit reversed addresses. The address pair generator can independently advance only one address in each address pair, and bit reversal of one address uniquely defines the other address.

29 Claims, 8 Drawing Sheets

SYMBOL
C = A + BW
D = A − BW

ADDRESS GENERATORS FOR MAPPING ARRAYS IN BIT REVERSED ORDER

CROSS-REFERENCE TO RELATED APPLICATIONS

None

FIELD OF THE INVENTION

The present invention is a method and apparatus to reduce the amount of required memory and instruction cycles when implementing Fast Fourier Transforms (FFTs) on a computer system. More particularly, the preferred embodiment of the present invention optimizes FFT software using in-place bit reversal (IPBR) implemented on a processor capable of bit reversed incrementation. Alternative embodiments implement the invention for out of place bit reversal (OOPBR) and on processors that do not support special instructions for bit reversed incrementation.

BACKGROUND OF THE INVENTION

Algorithms that perform discrete transforms such as Fast Fourier Transforms (FFTs) are well known. The Fourier transform is a mathematical operator for converting a signal from a time-domain representation to a frequency-domain representation. The inverse Fourier transform is an operator for converting a signal from a frequency-domain representation to a time-domain representation. The Discrete Fourier Transform (DFT) may be viewed as a special case of the continuous form of the Fourier transform. The DFT determines a set of spectrum amplitudes and phases or coefficients from a time-varying signal defined by samples taken at discrete time intervals.

As is well known, in the mid-1960's techniques were developed for more rapid computation of the discrete Fourier transform. These techniques became known as the fast Fourier transform (FFT), first described in a paper by J. W. Cooley and J. W. Tukey, entitled "An Algorithm for the Machine Calculation of Complex Fourier Series," Mathematics of Computation (1965), Vol. 19, No. 90, pp. 297–301. Some patents in the field of processing FFTs include U.S. Pat. No. 3,673,399 to Hancke et al for FFT PROCESSOR WITH UNIQUE ADDRESSING; U.S. Pat. No. 6,035,313 to Marchant for a MEMORY ADDRESS GENERATOR FOR AN FFT; U.S. Pat. No. 6,247,034 B1 to Nakai et al for a FAST FOURIER TRANSFORMING APPARATUS AND METHOD, VARIABLE BIT REVERSE CIRCUIT, INVERSE FAST FOURIER TRANSFORMING APPARATUS AND METHOD, AND OFDM RECEIVER AND TRANSMITTER; U.S. Pat. No. 4,823,297 to Evans for a DIGIT-REVERSAL METHOD AND APPARATUS FOR COMPUTER TRANSFORMS; U.S. Pat. No. 5,329,474 to Yamada for an ELEMENT REARRANGEMENT METHOD FOR FAST FOURIER TRANSFORM; U.S. Pat. No. 5,473,556 to Aguilar et al for DIGIT REVERSE FOR MIXED RADIX FFT; and U.S. Pat. No. 4,977,533 to Miyabayashi et al for a METHOD FOR OPERATING AN FFT PROCESSOR.

In performing a fast Fourier transform of the type known as a radix-two dimension-in-time FFT, the size of the transform is successively halved at each stage. In the illustrative circuit described in FIG. 2, a 32-point FFT is split into a pair of 16-point FFT's, which are in turn split into four 8-point FFT's, then eight 4-point FFT's, and finally sixteen 2-point FFT's. The resulting computation for a 32-point FFT is shown in the signal flow graph of FIG. 2. The quantities on the left hand side of the signal flow graph, ranging from x(0) to x(31) are the sampled inputs to the FFT, while the signals appearing at the right-hand side of the signal flow graph and numbered 0 through 31 are the resulting FFT coefficients. The signal flow graph illustrates that there are five passes or phases of operation, derived from the relationship that the number 32 is two to the fifth power.

The convention used in the signal flow graph is that an arrowhead represents multiplication by the complex quantity Wk adjacent to the arrowhead. The small circles represent addition or subtraction as indicated in FIG. 2a. If the input to each of the butterfly computational modules shown in FIG. 2a is indicated by signal names A and B, and the outputs are indicated by signal names C and D, then the computations performed in the butterfly module are: C=A+BW and D=A−BW. The W values are usually referred to as "twiddle factors" and represent phasors of unit length and an angular orientation which is an integral multiple of $2\pi/32$.

An aspect of FFT computation is that the results of each butterfly computation may be stored back in memory in the same location from which the inputs to the butterfly were obtained. More specifically, the C and D outputs of each butterfly may be stored back in the same locations as the A and B inputs of the same butterfly. This FFT computation is referred to as an "in-place" algorithm. Most discrete transforms are executed "in-place" to conserve memory, which in turn reduces system size, power consumption, cost, and allocates memory for other tasks. For such "in-place" FFTs, the reordering required to counteract the effect of the transform decompositions is achieved by a particular permutation of the elements of the data sequence.

Bit-reversed address mapping is commonly used in performing radix-2 FFTs. When the radix-2 FFT is computed, data must be rearranged in bit-reversed order. If the FFT is performed entirely by software, the FFT process uses an algorithm to pre-place data in memory in bit-reversed order prior to executing the butterfly computations.

Obtaining FFT efficiency is a high priority in the computer processor industry. The FFT algorithm has high intrinsic value and is widely used. The instruction cycle requirement of custom optimized FFT software is the accepted benchmark standard for measuring a processor's computational efficiency. For a specific type of FFT (e.g., in-place, using relocatable data memory, single precision, radix 2, complex, 256 point, unconditional ½ scaling per butterfly, etc.) the number of FFTs/sec executed is a more accurate relative measure of a processor's computational power than MIPs (millions of instructions per second). FFT software requiring fewer resources enhances both the real and projected capabilities of the processor.

Because an optimized FFT computation includes bit reversed addressing, many DSPs (Digital Signal Processors) include customized instructions to facilitate an efficient implementation of bit reversed addressing. Typically, this is done by special instructions that allow address registers to be incremented so that carry (or borrow) bits propagate toward less significant bits (backward). For normal addition carry bits must propagate toward more significant bits. The present invention is primarily intended to optimize FFT software implemented on a processor capable of bit-reversed address register incrementing in the described manner. However, the invention also has applications on processors that lack this capability.

Reference is made to Table I, listing a binary address, contents of memory before bit reversed ordering, the corresponding bit reversed binary addresses, and contents of memory after bit reversed ordering. Assume an input array is stored in $2^{(\log 2N+M)}$ contiguous words of memory, beginning at start address S_in. The array has $2^{\log 2N}$ elements and each element is stored in $2^{M}$ contiguous words of data memory. For example, four words of contiguous memory would accommodate two words of precision for both the real and imaginary part of complex input data elements. An arbitrary address for data memory containing the input array can be expressed in the form, $$AR1 = S\_in + [B\_(\log 2N - 1) * 2^{\wedge}(\log 2N - 1) + $$
$$B\_(\log 2N - 2) * 2^{\wedge}(\log 2N - 2) + ...B\_0 * 2^{\wedge}0] * 2^{\wedge}M + P$$

(each binary B_k coefficient can be zero or one, and P=0,1,2, ... $(2^{M})-1$).

The corresponding bit reversed address is obtained by reversing the order of the B_k values:

$$AR2 =$$
$$\text{bit\_rev}(AR1) = S\_out + [B\_0 * 2^{\wedge}(\log 2N - 1) + B\_1 * 2^{\wedge}(\log 2N - 2) + $$
$$...B\_(\log 2N - 1) * 2^{\wedge}0] * 2^{\wedge}M + P.$$

An array has been "bit reversed" after all input data is copied from its original location at address AR1, to its new location at address AR2=bit_rev(AR1). Sequential output array elements are rearranged in bit reversed order relative to the input array. Table I illustrates a bit reversed array for the case log 2N=3, M=S_in=S_out=0. The sequential addresses in the bit reversed address column are obtained by incrementing the prior address with 100 binary, and propagating any carry bit that results backwards. Self-reversed addresses occur when AR1=bit_rev(AR1). The fourth column in Table I illustrates bit reversed addresses AR1 which equal bit reversed addresses bit_rev(AR1) from either self reversal of AR1 addresses, such as binary AR1=1,1,1; and bit reversed sequence addresses that equal some AR1 address other than those that are self reversed, such as bit reversed binary address 0,0,1 equals the bit reversed binary address 1,0,0. For typical processors and software, the output buffer must be "aligned", i.e., S_out for S_in must be a multiple of $2^{(\log 2N+M)}$ for bit reversed address register incrementation to work properly.

TABLE I

Bit Reversed Mapping of an Exemplary Array

| Memory before bit reversed mapping of array | | Mapping of array elements | | Memory after bit reversed mapping of array | |
|---|---|---|---|---|---|
| Binary address | Contents of memory before bit reversed ordering | Move contents to Bit reversed Binary address | Data move | Binary Address | Contents of memory after bit reversed ordering |
| 000 | 56 | 000 | → | 000 | 56 |
| 001 | 13 | 100 |  | 001 | 18 |
| 010 | -4 | 010 |  | 010 | -4 |
| 011 | 23 | 110 |  | 011 | -24 |
| 100 | 18 | 001 |  | 100 | 13 |
| 101 | 9 | 101 |  | 101 | 9 |
| 110 | -24 | 011 |  | 110 | 23 |
| 111 | 66 | 111 | → | 111 | 66 |

Out of place bit reversal (OOPBR) refers to the technique of bit reversing an input data array so that the output data array falls elsewhere in data memory, i.e., S_in ≠ S_out, whereas in place bit reversal (IPBR) refers to the technique of re-ordering elements of an input data array in bit reversed order so that the output array overwrites the input array, i.e. S_in=S_out. For some applications, OOPBR may be advantageous if input data is located in slower, hence cheaper, memory, and faster "scratch" or "volatile" memory is available to generate the bit reversed output array. The subsequent FFT operations on the bit reversed array exploit the faster memory. For this case the cycles required may exceed the benchmark OOPBR FFT cycles, because the digital signal processor (DSP) manufacturer will measure the benchmark case with both the input and output OOPBR array in the fastest memory. An FFT using OOPBR may have a hidden cycle penalty beyond the bit reversal itself, when the output is eventually copied back to the location of the input array. Computational processes that use more of the available scratch memory than necessary can lead to future problems when converting to an operating system that permits multiple computational processes to interrupt each other.

For other applications, the input data for the FFT is already located in fast data memory. For example, the input data may be arrived at as the result of many computations, and for adequate optimization of MIPs (Millions of Instruction cycles Per Second), the FFT input array may already be in fast memory. In that event, OOPBR increases the amount of fast data memory required by the entire FFT by a factor of two. This is the case because the rest of the FFT embodies an intrinsically in place algorithm, requiring no additional data memory other than the input array itself. In the event that the cycles required for IPBR can be made more competitive relative to OOPBR, for many applications the additional data memory requirement of OOPBR cannot be justified.

The second and third columns of Table II illustrate the same sequence of address pairs given in columns one and three of Table I. The conventional IPBR address generator yields these address pairs for N=8. The fourth column indicates which address pairs are needed for IPBR, i.e., unique address pairs referencing data that needs to be swapped. The fourth column of Table II also illustrates that for an array of eight elements, the address pair generator conventionally used for IPBR produces useful address pairs for address pair numbers two and four, which is only two out of eight bit reversed pairs.

TABLE II

Conventional IPBR Address Pair Generator Results for an N = 8 Element Array

| Address pair number | Binary address | Bit reversed Binary address | Address pair needed for IPBR mapping array in bit reversed order? |
|---|---|---|---|
| 1 | 000 | 000 | No, self-reversed |
| 2 | 001 | 100 | YES |
| 3 | 010 | 010 | No, self-reversed |
| 4 | 011 | 110 | YES |
| 5 | 100 | 001 | No, redundant with address pair 2 |
| 6 | 101 | 101 | No, self-reversed |
| 7 | 110 | 011 | No, redundant with address pair 4 |
| 8 | 111 | 111 | No, self-reversed |

A flawed IPBR algorithm is now described to illustrate the problems encountered attempting to optimize IPBR. The first address register is initialized to S_in, and each iteration of this first address register is advanced linearly to reference the next array element in their natural order. A second address register is also initialized to S_in and is incremented each iteration in a bit reversed manner to obtain the corresponding bit reversed version of the first address. Thus a new pair of addresses is generated each iteration, as illustrated by columns 2 and 3 of Table II. After each bit reversed address pair is generated, the contents of memory referenced by the first and second address registers are exchanged. This technique will work for OOPBR. But for IPBR, all the self-reversed address contents are needlessly exchanged once. All the non-self-reversed address contents are erroneously exchanged twice. The first address register at some point references every element in the array, so if the address pair (A, B) is generated, (B, A) is also generated somewhere in the sequence of address pairs. This flawed IPBR approach exchanges data, referenced by any non-self-reversed address and its bit reversed compliment, not once but twice, resulting in an output array that is equivalent to the input array.

The conventional IPBR algorithm in the prior art involves a modification of this flawed approach. The conventional IPBR algorithm generates address pairs in a manner identical to the described flawed algorithm. However, instead of always swapping the contents referenced by each address pair that is generated, the swap is only executed if the address generated by linear incrementing is less than the address produced by bit-reversed incrementing. Note the criterion of the first address being less than the second identifies the first occurrences of useful address pairs for IPBR in Table II. This condition for swapping eliminates transferring data from self-reversed addresses and prevents swapping for one of the redundant pairs of non-self-reversed addresses. Implementing the conditional swapping typically requires transferring both address registers into accumulators, subtracting, and conditionally branching. For this reason, typical IPBR implementations require two to ten times as many instruction cycles as OOPBR implementations.

The conventional IPBR method is inefficient because it relies on an address pair generator that yields extraneous address pairs.

SUMMARY

The present invention is a method and apparatus to optimize in place bit reversal (IPBR) in computer systems. More particularly, the present invention reduces the amount of required memory and instruction cycles when implementing Fast Fourier Transforms (FFTs) on a computer system. The preferred embodiment optimizes FFT software using IPBR implemented on a processor capable of bit reversed incrementation, such as the Texas Instruments (TI) C54x digital signal processor (DSP). However, alternative embodiments implement the invention for out of place bit reversal (OOPBR) and on processors that do not support special instructions for bit reversed incrementation.

The present invention is an address pair generator that yields every non-self-bit-reversed address in the input array only once, thereby avoiding production of extraneous address pairs. To optimize IPBR, every non-self-bit-reversed address in the input array needs to be generated only once, while making simple, computationally efficient increments, or moves, away from the previous pair of bit reversed addresses. The address pair generator of the present invention independently determines, or moves, only one address in each address pair. For any address pair, bit reversal of one address uniquely defines the other address.

The present invention facilitates the identification of computationally efficient patterns for sequentially generating a unique set of bit reversed address pairs. Five exemplary new IPBR methods and modifications of these methods are presented. The size of the array to be bit reversed is $2^{(\log 2N)}$. For use on a DSP capable of bit reversed incrementation of address registers but having only one address increment register, optimized program code implementing Method 1 requires minor changes to work for odd and even log 2N. For processors with more than one address increment register available, optimized code implementing Method 1 works for all values of log 2N. Method 2 further reduces cycles for odd log 2N. Method 3 reduces cycles for the even log 2N arrays relative to Method 1. Method 4 is similar to Method 1, however Method 4 does not pose any problem for processors with only one address increment register. Method 1 is unique in that it reduces the alignment requirement. Method 5 extends Method 3 to work for odd log 2N.

Methods 1m, 2m, 3m, and 4m are modifications of Method 1, 2, 3, and 4 respectively. All these modified Methods require only two address registers. The cycle count for Method 2m and Method 2 will be very close, if not identical. The other modified methods require fewer address registers, but increase the number of nested inner loops. Thus Methods 1m, 3m and 4m may reduce or increase cycles relative to their unmodified counterparts, depending on the processor.

An application of the present invention is for use as IPBR software that removes the typical input buffer alignment restriction for bit reversed addressing. This application is important because the rest of an FFT can be implemented without any buffer alignment restriction. By giving up some of the cycles this invention saves, the requirement for input buffer alignment is completely removed. Efficient removal of the alignment requirement may require inner loops that always bit reverse increment the same element of the address pair. This can make Methods 1 and 4 the optimal choice for IPBR without an alignment restriction. Method 1 is unique in that even without alignment removal, its inherent alignment requirement is relaxed to $2^{\wedge}(\log 2N/2 -1)$ for even log 2N and $2^{\wedge}((\log 2N-1)/2)$ for odd log 2N. All other methods have an inherent $2^{\wedge}(\log 2N)$ alignment requirement.

The invention also reduces OOPBR cycles for processors that do not support bit reversed address register incrementation and require many cycles to generate a bit reversed address. This OOPBR method removes the start address offset from the address pair sequence generated, and consequently this OOPBR method need not impose any alignment constraints on the input or output buffer.

BRIEF DESCRIPTION OF THE DRAWINGS

Preferred embodiments of the invention are discussed hereinafter in reference to the drawings, in which.

DETAILED DESCRIPTION OF THE INVENTION

Figure 1:
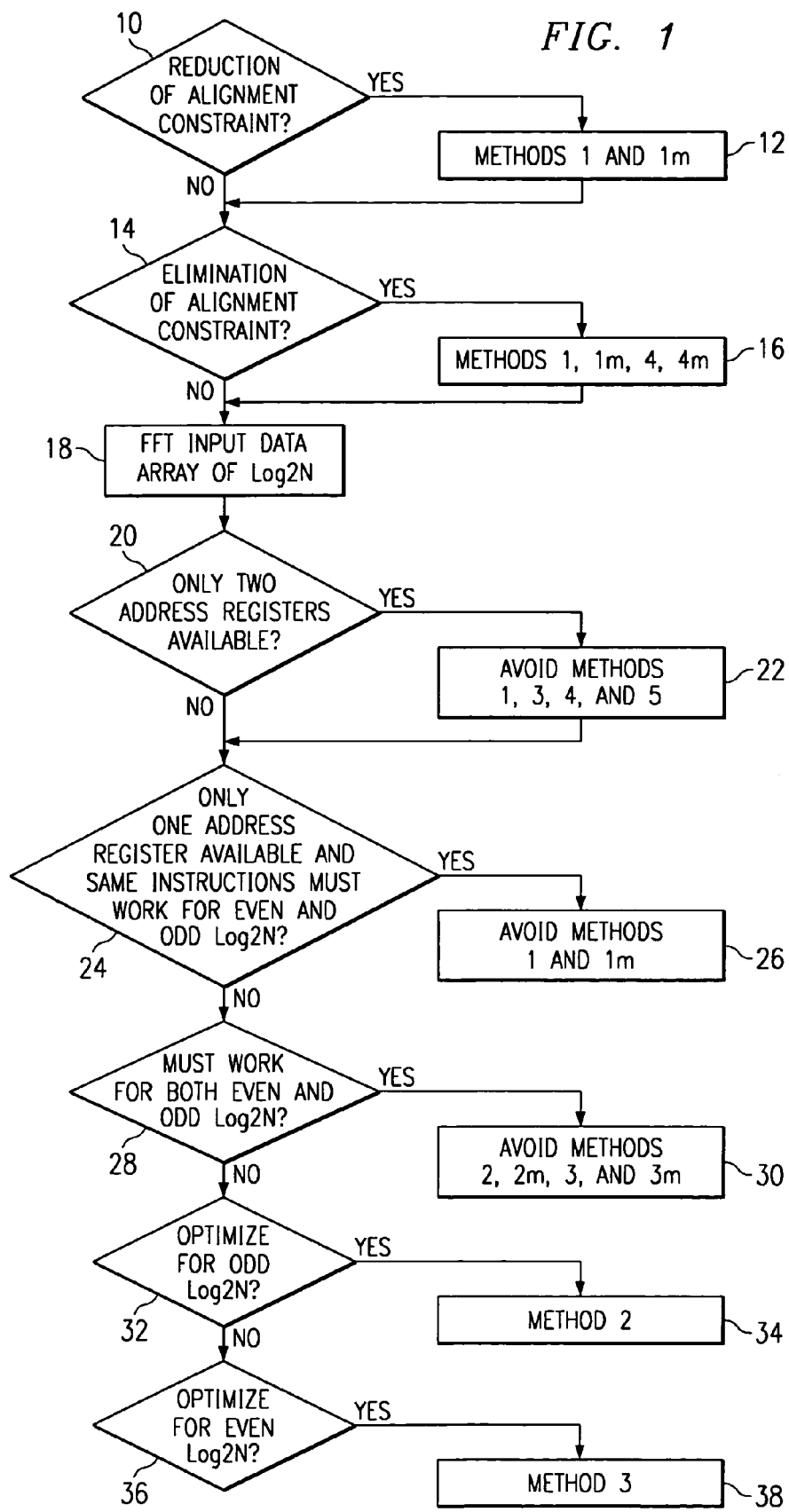
FIG. 1 illustrates a decisional flowchart to choose a method of IPBR.
Figure 2:
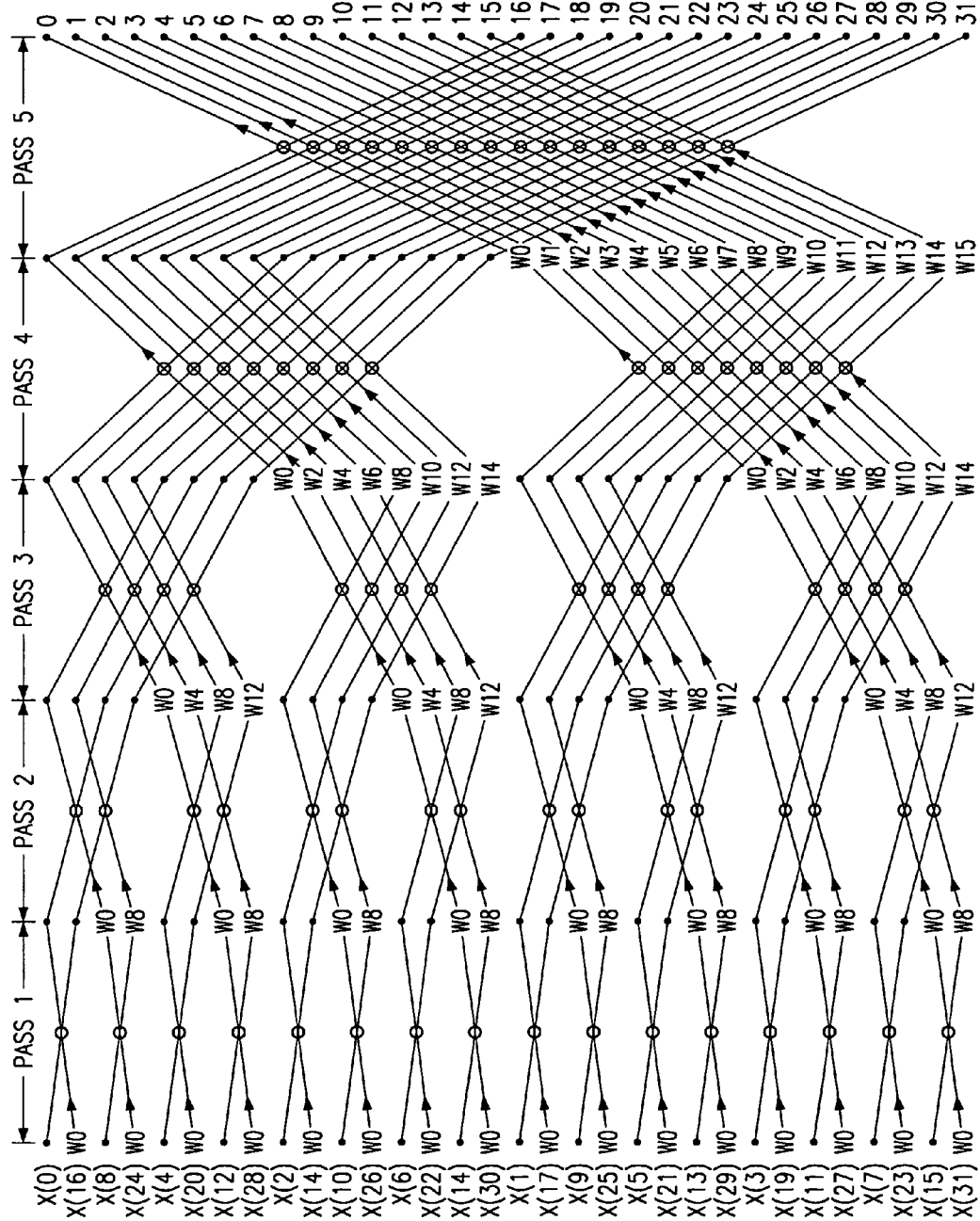
FIG. 2 is an illustrative signal flow graph of a fast Fourier transform in the prior art.
Figure 2A:
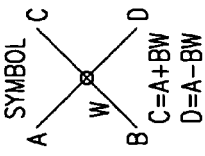
FIG. 2a is an illustration of computations made in FIG. 2.

The preferred and alternative exemplary embodiments of the present invention include methods of in place bit reversal (IPBR) that are computationally efficient patterns to generate sequential address pairs for computing fast Fourier transforms in a processor. To decide which of the methods of the present invention is most efficient for a specific application, reference is made to the decisional flowchart of FIG. 1. Assume an input array 10 is stored in $2^{\wedge}(\log 2N+M)$ contiguous words of memory, beginning at start address S_in. The array has $2^{\wedge} \log 2N$ elements and each element is stored in $2^{\wedge}M$ contiguous words of data memory. For example, four words of contiguous memory would accommodate two words of precision for both the real and imaginary part of complex input data elements.

In the present invention, five new IPBR address generators for mapping arrays in bit reversed order are disclosed. Methods 1m, 2m, 3m, 4m are modifications of the respective method. Many of the methods and address generators presented herein have been implemented on a TI C54x digital signal processor (DSP) that is manufactured by Texas Instruments. New methods for out of place bit reversal (OOPBR) address generation are also presented.

The present invention discloses methods and devices for organizing array addresses into three sets, A, B, and C, to facilitate the creation of more optimal IPBR address pair generation. Every address in set A has a corresponding bit reversed address in set B. Set C contains all the self reversed addresses. Once these sets are defined, the new address pair generator systematically advances through every element of set A to define the first address of each address pair. Since only one address of each pair is independently defined, by using the appropriate complimentary bit reversed advance, the second address increment is also defined. The three sets of addresses are defined so that simple and efficient means exist for systematically stepping through every address in set A.

The method in the present invention for dividing addresses into sets is as follows. For an array of length $2^{\wedge}(\log 2N)$, let Q equal the truncated integral quotient of log 2N/2. Each array element address in binary form is divided into its Q most significant bits (MSBs), denoted by "x", and its Q least significant bits (LSBs), denoted by "y". For even log 2N, there are two ways to uniquely define the set of sets A, B, and C. One way is to divide up the addresses with the bit reversed Q LSBs greater than, less than, or equal to the Q MSBs. The second way is to divide up addresses with the Q LSBs greater than, less than, or equal to the bit reversed Q MSBs.

For odd log 2N, there are three ways to divide the addresses in three sets listed in Table III. After discarding the middle Q+1 th bit, the first two ways are the same as the even log 2N case. The third way is to reverse the inequality in the inequality relationship defining a set, according to whether the Q+1 th middle bit of the address is zero or one. For the purposes of graphically visualizing all array element addresses and recognizing an easy way to step through set A, appropriately append the middle Q+1 th bit to either the x or y axis data. Here it is prefixed to the vertical axis data. For odd log 2N, IPBR Method 1 uses the first way for defining the three sets, Method 3 uses the second way, and Method 2 and 5 use the third way.

For Q=log 2N>>1 let x be the Q MSBs and y be the Q LSBs. Let z be the middle Q+1 st bit for odd log 2N. For Table III, the bit_rev( ) operator reverses Q bits.

TABLE III

Methods for Dividing Addresses Into Three Sets

| log2N value | Set division "way" | Set A or Set B | Set B or Set A | Set C |
|---|---|---|---|---|
| Even and odd log2N | First way | bit_rev(y)>x | bit_rev(y)<x | bit_rev(y)=x |
| | Second way | y>bit_rev(x) | y<bit_rev(x) | y=bit_rev(x) |
| Odd log2N only | Third way | bit_rev(y)>x if z=0 bit_rev(y)<x if z=1 y>bit_rev(x) if z=0 y<bit_rev(x) if z=1 | bit_rev(y)<x if z=0 bit_rev(y)>x if z=1 y<bit_rev(x) if z=0 y>bit_rev(x) if z=1 | bit_rev(y)=x y=bit_rev(x) |

The "filtered" conventional IPBR address pair generator, defined as the conventional IPBR address generator after extraneous pair removal, is segregated using the first way. The "filter" accepts only address pairs with first address, given by "a", that satisfy a<bit_rev(a). For even log 2N, define xy as the number with MSBs equal to x and LSBs equal to y. Then a<bit_rev(a) implies xy<bit_rev(xy) and thus x<bit_rev(y) so the bit reversed Q LSBs are greater than the Q MSBs. Thus, this invention includes a criterion equivalent to the conventional IPBR criterion, but uses a more useful form of this criterion earlier in the conceptual process to avoid later extraneous pair removal.

An important application of the present invention is in IPBR address generators and methods that remove the typical input buffer alignment restriction for bit reversed addressing. This is important because the remaining FFT process can be implemented without any buffer alignment restriction. By contributing some of the cycles that are conserved by the present invention, software may be added that completely removes the requirement for input buffer alignment. Efficient removal of the alignment requirement may require inner loops that always bit reverse increment the same element of the address pair. This can make Methods 1 and 4 the optimal choice for IPBR without an alignment restriction. Method 1 is unique in that even without being modified for alignment removal, its inherent alignment requirement is relaxed to $2^{(\log 2N/2-1)}$ for even log 2N and $2^{((\log 2N-1)/2)}$ for odd log 2N. All other methods have a $2^{(\log 2N)}$ alignment requirement.

Referring to FIG. 1, the figure is a decisional flowchart providing selections to implement specific methods for address pair generators of the present invention based upon certain information. The address generators of the present invention can perform without an alignment restriction or with merely a relaxed alignment restriction. For performing address pair generation with only a reduction of the alignment constraint 10, Methods 1 and 1m are appropriate 12. If an elimination, instead of reduction, of the alignment constraint 14 is preferred, then Methods 1, 1m, 4, and 4m are appropriate 16.

The address generator of the present invention generates bit reversed addresses for an FFT with a size log 2N input array 18 for use on a digital signal processor or other processing means capable of performing FFT operations. When only two address registers are available on a processor 20, then IPBR Methods 1, 3, 4, and 5 should be avoided 22. If only one address register is available on a processor 24, then only Methods 1 and 1m should be avoided 26 in processing an FFT. When the operations must work for both an even and odd log 2N input array 28, Methods 2, 2m, 3, and 3m should not be used. However, if the input array is only an even log 2N or an odd log 2N, specific methods can be chosen for optimal reduction of MIPS while processing. To optimize an odd log 2N input array 32, Method 2 is the most efficient method in most operations 34. To optimize an even log 2N input array 36, Method 3 is the most efficient method in most operations 38.

To create the IPBR generators and their modified versions of the present invention, x, y plots are used to plan the path to follow with a method prior to defining the method itself. Specific cases for IPBR methods of the present invention and the conventional method are plotted in FIGS. 3–14. For all plots, M=S_in=S_out=0. Each IPBR method generates a sequence of address pairs. The first address of an address pair is represented by AR1 and the second address by AR2. Here AR1=bit_rev(AR2) and AR2=bit_rev(AR1). Sequential AR1 and sequential AR2 values are shown in the plots. Each square in the plots, formed by the x and y axis grid, represents the address of a unique element in the input array. In other words, on the graphs every array address is represented by one square. For log 2N=6, the x axis value gives the three most significant bits (MSB) of an address, and the y axis value gives the three least significant bits (LSB) of a six bit address. Address coordinates are offset by (½, ½) to force the plots into the middle of a square made by the plot's grid. The address corresponds to the square's lower left corner coordinates. The first addresses of each bit reversed pair (the AR1s) are graphed using small circles. The second address of the each address pair (the AR2s) are graphed using small squares. Sequential AR1 address values are connected with a dashed line connecting the circles. Sequential AR2 address values are connected with a solid line connecting the small squares.

Figure 3:
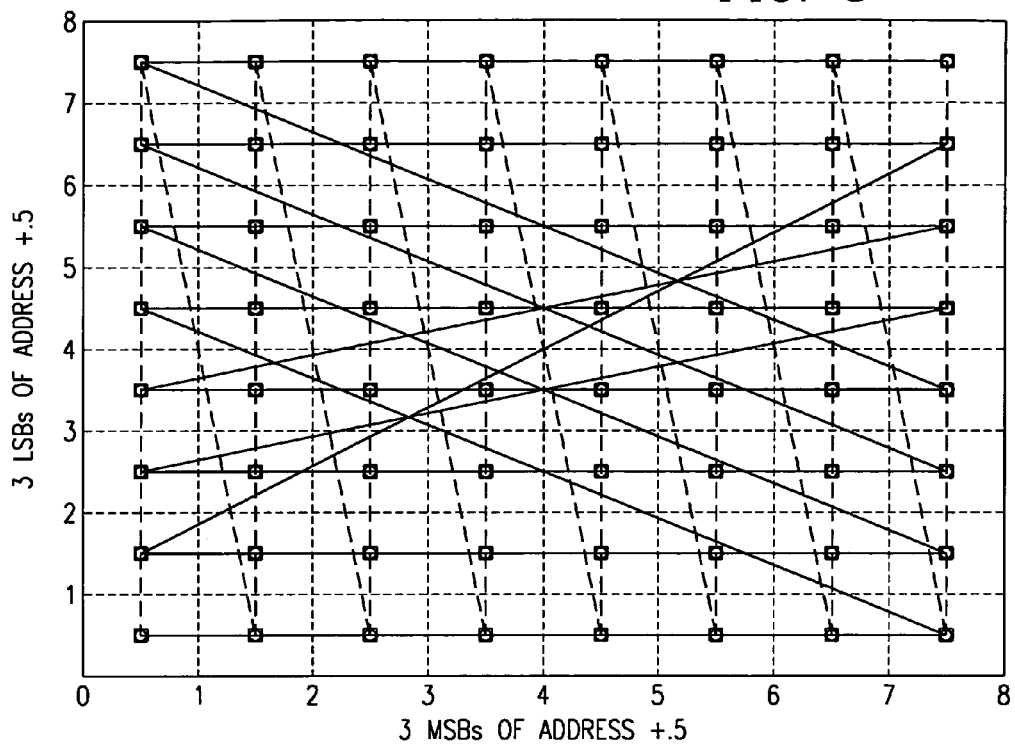
FIG. 3 is an illustrative graph of a conventional IPBR address generation.

FIG. 3 illustrates the sequence of addresses generated using the conventional IPBR method found in the prior art. For the conventional method, the initial address pair is graphed at AR1=0=(0,0) and AR2=0=(0,0). The second address pair is at AR1=(0,1) and AR2=(4,0). For this second address pair note (b indicates binary); AR2=bit_rev(AR1) =bit_rev(1)=bit_rev[(0,1)]=bit_rev(000 001 b)=100 000 b=(4,0)=32.

Note that both a circle and a square symbol land on every grid square in FIG. 3. For the conventional method, the address generation scheme "lands" on every square twice. For any array element address x, the address pair AR1=x, AR2=bit_rev(x) occurs in the sequence of address pairs, as well as AR1=bit_rev(x), AR2=x. If one swapped the contents of memory referenced in the bit reversed pair of addresses every time a new pair of addresses is generated, then the data referenced by these redundant bit-reversed pairs would be swapped twice, and data would end up back where it started. The conventional address generation scheme has 3 computational penalties: (1) because every non-self-bit-reversed address is generated twice, twice as many iterations are needed; (2) testing and conditional branching is required to break the degeneracy and swap only once per address; and (3) the self-bit-reversed addresses are also generated by the sequence of address pairs. For example, the address (5,5) corresponds to binary address 101 101 b, which remains the same after bit reversal. Since the memory referenced by a self-bit-reversed address does not need to be exchanged with itself, it wastes additional cycles when the IPBR address generation scheme generates self-bit-reversed addresses.

The five IPBR methods of the present invention are defined by sequential increments or "moves" of the two "bit reversed pairs" (AR1, AR2) and (AR3, AR4). For two addresses, A and B, if B=bit_rev(A) then it follows that A=bit_rev(B) and (A,B) form a "bit reversed pair". The array size is $2^{\log 2N}$. Variable "Q" is defined as the truncated integral quotient of log 2N/2, i.e., odd log 2N is (log 2N-1)/2 and even log 2N is (log 2N/2); and where variable "R" is defined as the remainder of log 2N/2. Address increments are $I0=2^{(\log 2N-1)}$, $I1=2^{(\log 2N-Q-1)}$, $I2=2^Q$, $I3=2^{(\log 2N-Q)}$, $I4=2^{(Q-1)}$, $I5=2^{(\log 2N-2)}$. The address increments form four bit reversed pairs, i.e., (1,I0), (I1,I2), (I3, I4), and (2, I5). Bit reversed increments are indicated by a suffix of B. For the bit_rev operator that reverses the order of bits:

$$ARx=ARx+IyB=\text{bit\_rev}[\text{bit\_rev}(ARx)+\text{bit\_rev}(Iy)].$$

An exemplary preferred embodiment of the present invention is Method 1. Method 1 may be implemented for both odd and even log 2N input array sizes. This address generation scheme generates only unique address pairs referencing data that needs to be swapped for IPBR, thereby eliminating the testing and conditional branching found in methods of the prior art and eliminating the waste of additional instruction cycles due to IPBR address generation for redundant and self-reversed addresses.

Figure 4:
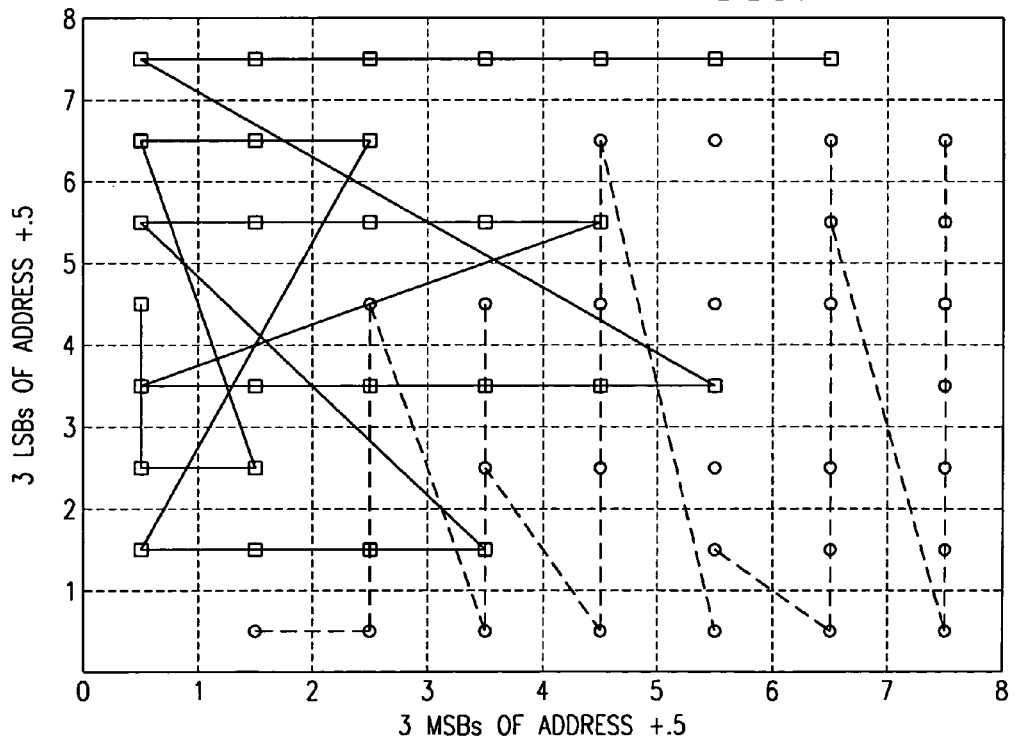
FIG. 4 is an illustrative graph of Method 1 for IPBR address generation.

FIG. 4 illustrates the result of Method 1 for generating bit reversed address pairs. The first pair of bit reversed addresses is AR1=(x1,y1)=(1,0)=[001 000b]=8 and AR2= (x2,y2)=(0,4)=[000 100b]=4. Thus in FIG. 4, (1,0) initiates the sequence of first addresses in each sequential address pair generated, and (0,4) initiates the sequence of second addresses. For each address pair, the second address gives the first address bit-reversed. Note that every square (unique address) is generated only once, and no self-bit-reversed addresses are generated. For example, the address generation scheme never lands on the (5,5) square of address 101 101b, which thus has no circle or square symbol in FIG. 4. Because the address generation scheme generates only unique address pairs referencing data that needs to be swapped for IPBR, the testing and conditional branching is eliminated.

Figure 5:
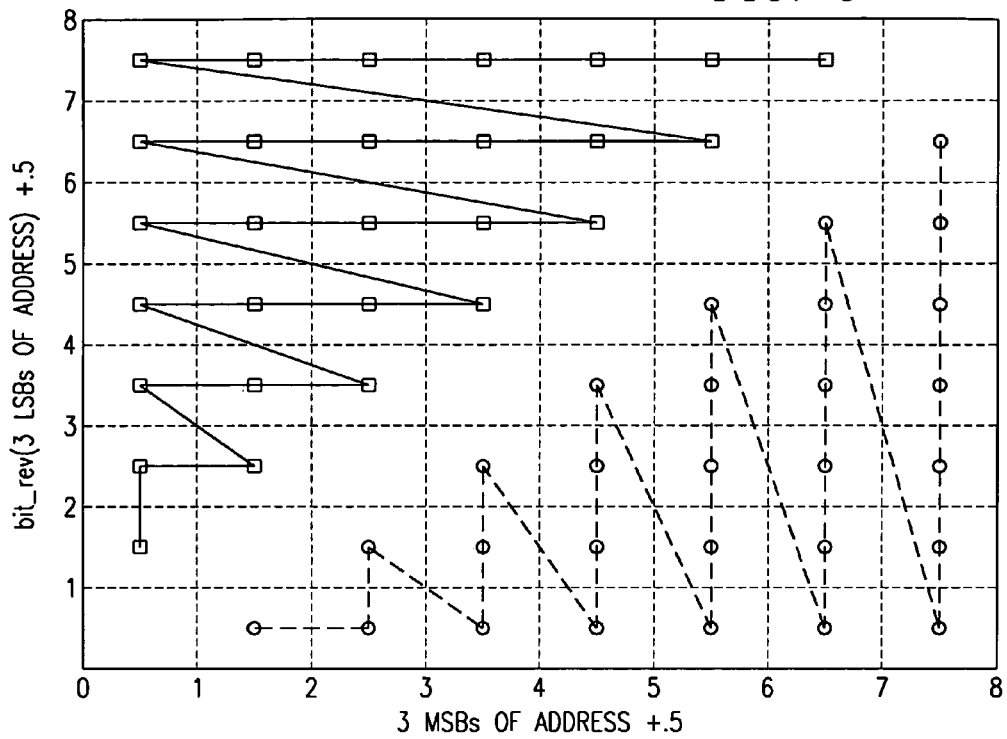
FIG. 5 is an illustrative graph of Method 1 for IPBR address generation.

To understand the concept behind Method 1 and subsequent methods of the present invention, it is helpful to bit reverse the y-axis data of FIG. 4, which is illustrated in FIG. 5. After this mapping, self-reversed addresses all lie on a diagonal line. The plot is split in an imaginary line from (0,0) to (8,8) diagonally through the graph. This divide splits the graph area into two triangles: a top and a bottom triangle. The bit reversed address of every square in the upper triangle is located in the lower triangle. By keeping AR1 in the lower triangle, AR2 in the upper triangle, and systematically stepping through each square (or address), Method 1 avoids all redundant pairs and self-reversed addresses.

All the IPBR Methods of the present invention can be modified in three different ways by replacing part or all of the address pair sequence with a "topologically similar" sequence. Variations of the IPBR Methods include 1) x and y axis inversions of the original sequence, and 2) reversing the order of the original subsequences, 3) replacing an (A,B) address pair with (B,A) address pair for arbitrary numbers of terms in sequences.

Method 1 uses the first way of defining three sets, so the y axis data is bit reversed. Set A contains all the array element addresses with bit_rev(y)<x, Set B contains addresses with bit_rev(y)>x, and for Set C, bit_rev(y)=x. Method 3 and 4 use the "second" way of bit reversing the x axis data. Set A contains all the addresses with y>bit_rev(x), Set B contains addresses with y<bit_rev(x) and for Set C, y=bit_rev(x). The general technique is illustrated by FIG. 5 for Method 1. For Method 1, Set A is the lower triangle, Set B the upper triangle, and Set C elements lie along the diagonal.

Any method can be altered by interchanging the order of the first and second addresses of an address pair, which is a third way of defining sets for bit reversal of the present invention. Such exchanges may be favorable for reducing program code or cycles but should not be thought of as producing a different address pair generator that is not included in this invention. The only difference is that in alternating subsequences, the choice of first and second address is exchanged. Such an exchange does not result in a new address pair, and is therefore an IPBR address pair generator within the scope of the present invention. There are many other methods, not explicitly defined herein, for systematically stepping through set A. For example, the generator could proceed through set A using horizontal lines instead of vertical lines as in Method 1, which advances along vertical lines whenever possible in the lower triangle of FIG. 5.

To perform in place bit reversal, Method 1 uses three "moves" defined in Table IV. For odd log 2N, I2=I1. For even log 2N, I2=I1+I1. This results in different optimized code for even and odd log 2N cases on processors with only one address increment register.

TABLE IV

Moves for Method 1

| Move 1 | Move 2 | Move 3 |
|---|---|---|
| AR1=AR1+I1B | AR1=AR3 | AR3=AR3+I3 |
| AR2=AR2+I2 | AR2=AR4 | AR4=AR4+I4B |

Method 1 is implemented with the following steps:

```
Initialize AR3=S_in, AR4=S_in.
Iterate from k=(R+1) to (R+1)*((2^Q)-1) in steps of (R+1)
    Move 3
    Move 2
    Iterate from j=1 to k-1 in steps of 1
        Move 1
    End of j loop
End of k loop
```

Therefore, to implement the operations of Method 1, addresses AR3=S_in, AR4=S_in are initialized. Method 1 iterates from k=(R+1) to (R+1)*((2^Q)-1) in steps of (R+1); performs Move 3; performs Move 2, iterates from j=1 to k-1 in steps of 1; performs Move 1; and then ends iterations of the j loop and then ends iterations of the k loop. The address pair sequence generated for Method 1 is defined by all the values that AR1, AR2 take on after moves that affect these values (not Move 3).

Figure 6:
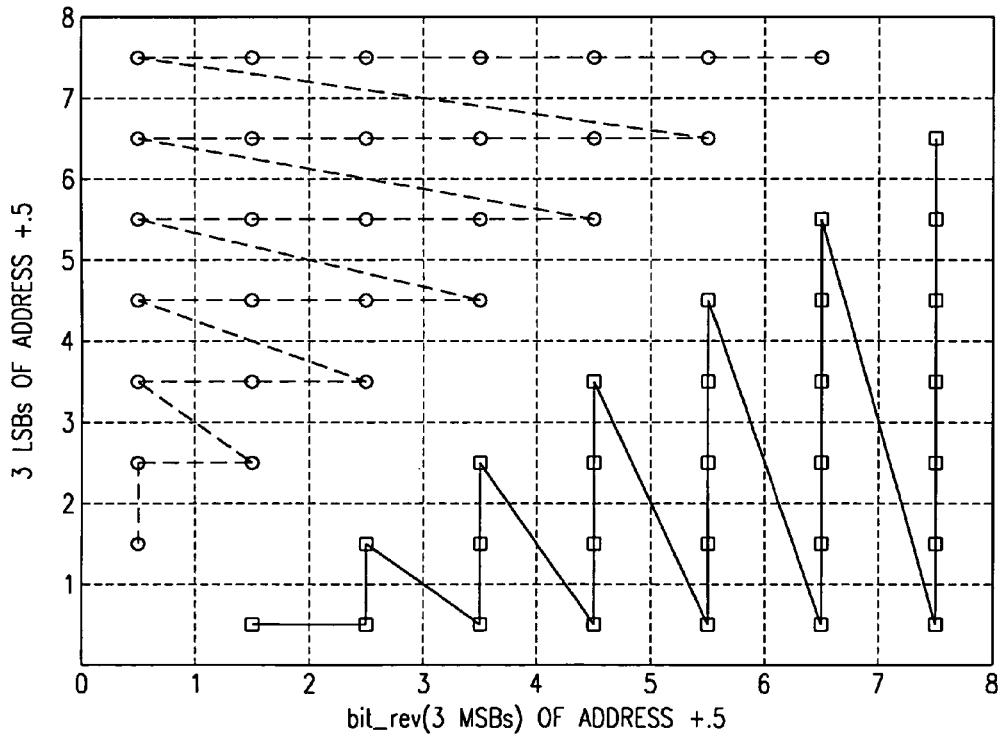
FIG. 6 is an illustrative graph of Method 4 IPBR address generation scheme for N=64 addresses.
Figure 7:
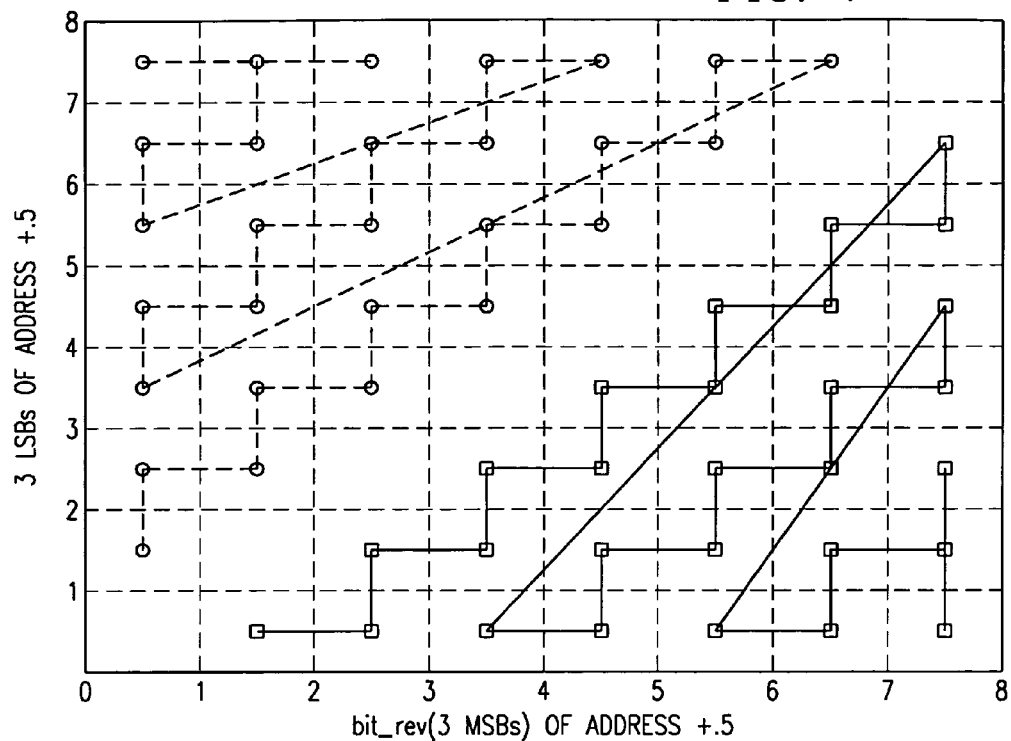
FIG. 7 is an illustrative graph of Method 3 IPBR address generator.

Method 4, illustrated in the graph in FIG. 6, has initial pair AR1=1, AR2=32. Note x axis data is bit reversed, unlike Method 1 in FIG. 4. FIG. 7 illustrates Method 3. The first address pair is AR1=(0,1) and AR2=(4,0). For even log 2N, this varies from Method 4 by using a zig-zag pattern to step through the same sets, instead of advancing horizontally or vertically when possible.

Figure 8:
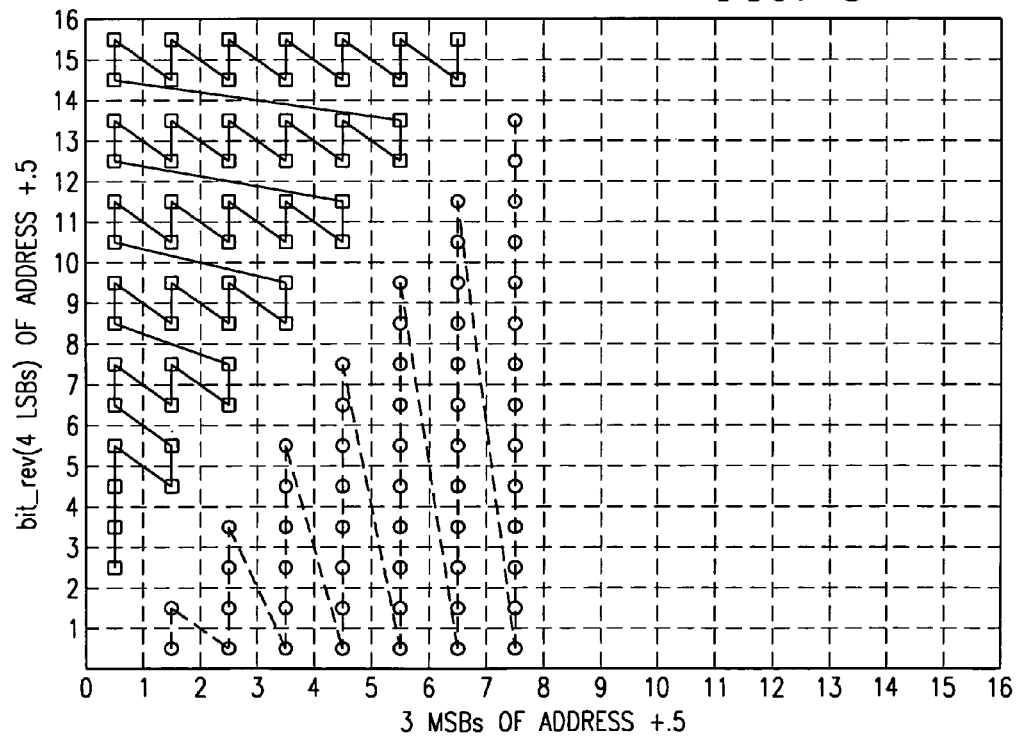
FIG. 8 is an illustrative graph of Method 1 IPBR address generation for odd log 2N.

For the segregation into three sets for odd log 2N in FIG. 8, set A is in the lower triangle, which is systematically covered by the first address of the Method 1 IPBR address pair generator. The self reversed set, C, forms a line with slope 2. The vertical axis data, referred to as zy, has been prefixed by the middle bit z. For the new zy vertical axis in FIG. 8, set A is defined by (bit_rev(zy)>>1)<x. This is equivalent to bit_rev(y)<x. Thus bit_rev(y)<x defines set A here.

Figure 9:
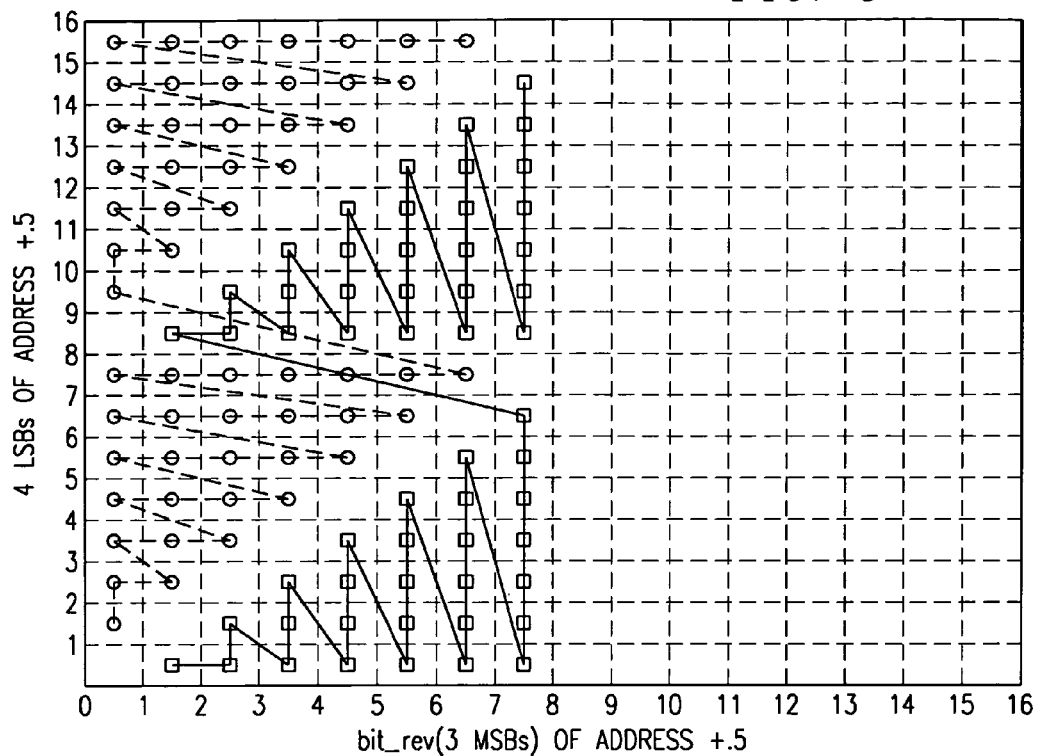
FIG. 9 is an illustrative graph of Method 4 IPBR address generation for odd log 2N.
Figure 10:
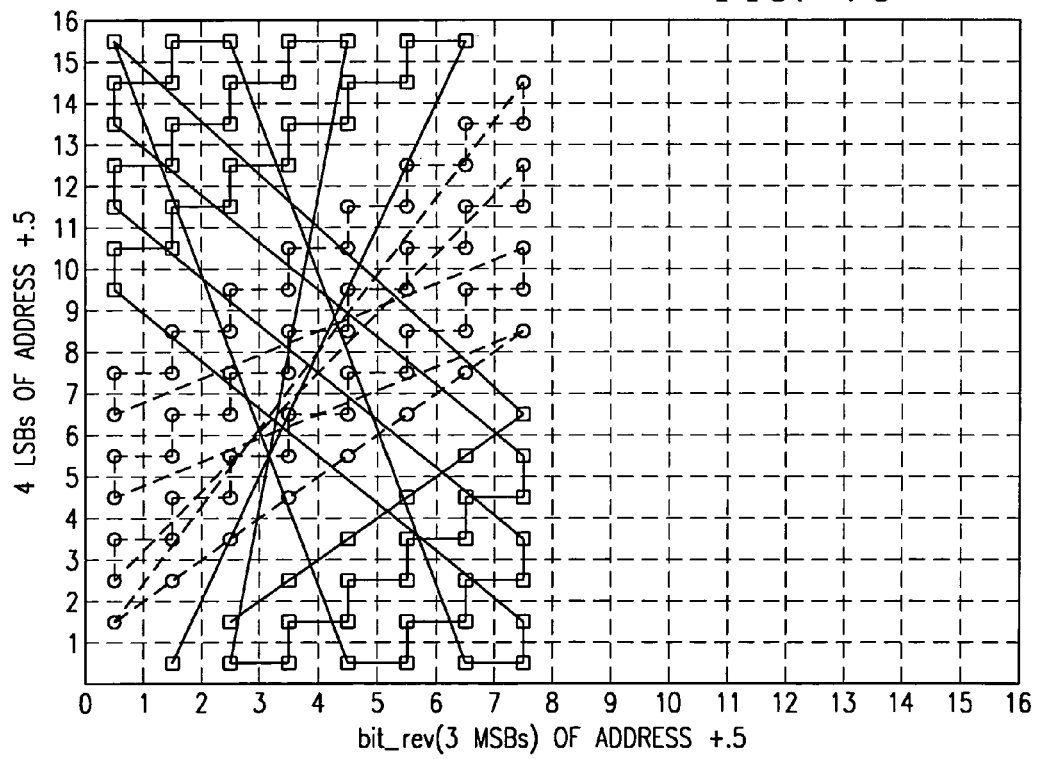
FIG. 10 is an illustrative graph of Method 2 IPBR address generation for odd log 2N.
Figure 11:
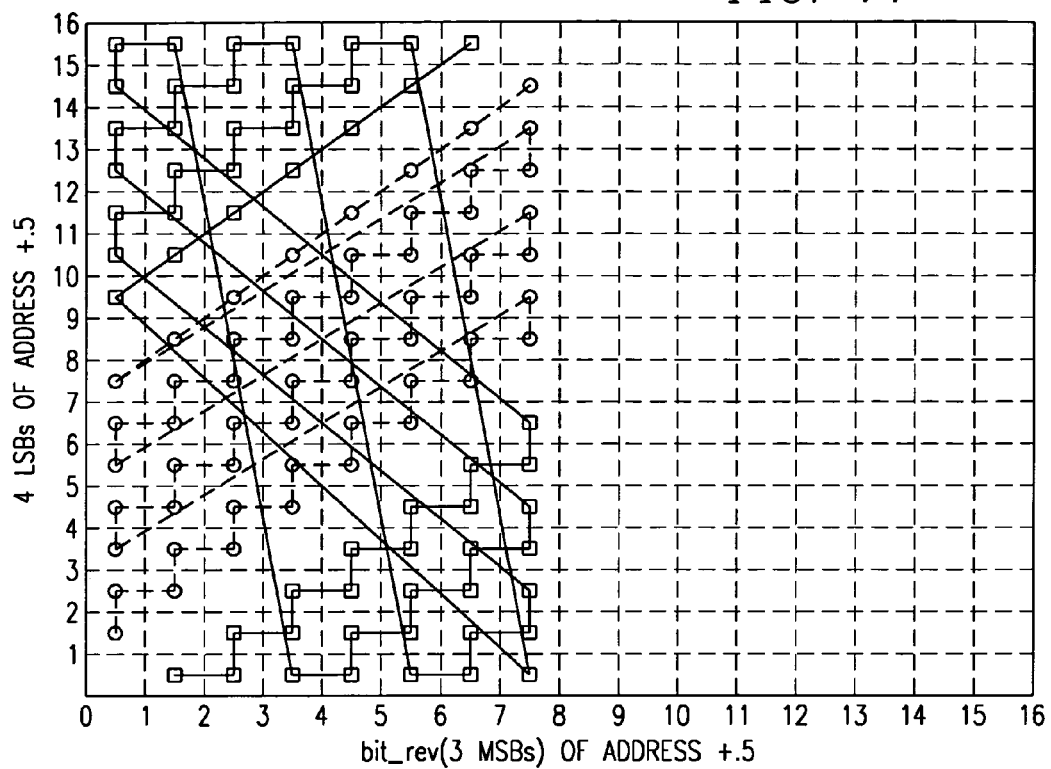
FIG. 11 is an illustrative graph of Method 5 IPBR address generation.
Figure 12:
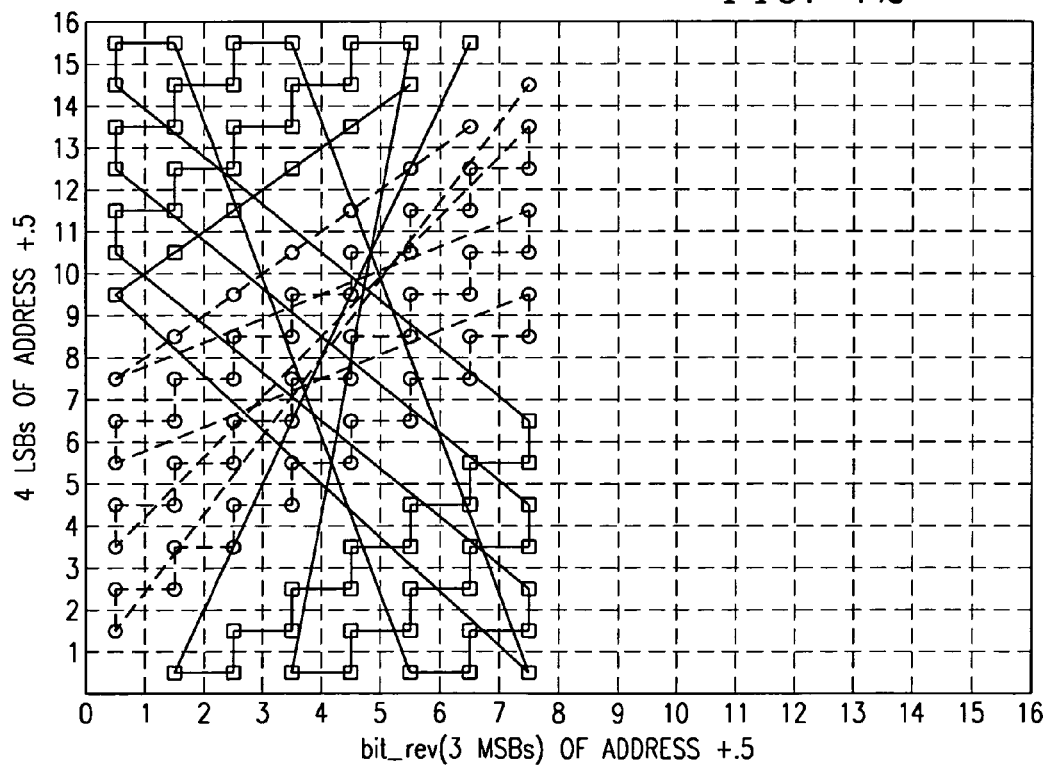
FIG. 12 is an illustrative graph of Method 2m IPBR address generation.

The "second way" described for segregating three sets of addresses for odd log 2N is used by Method 4, as illustrated by FIG. 9. Next, the "third way" to segregate the addresses into three sets for odd log 2N is illustrated in FIGS. 10 for Method 2 and FIG. 11 for Method 5. Method 2 is a special case where Set A is defined as the union of two sets with reversed inequalities, depending on whether the Q+1 st bit is zero or one. This definition of Set A facilitates a special technique exploited by Method 2 for continuing to use the same address advance increment scheme even when faced with the Set A zy-axis vertical boundary. The address sequence "wraps around" while continuing to use the same increment with no special treatment required for handling Set A's boundary. This method used by Method 2 cannot easily be extended to the even log 2N case, so Method 2 only works for odd log 2N. Method 3 can be extended to work for odd log 2N. This is done by Method 5, which reduces to Method 3 for log 2N. Combining even and odd log 2N capability in Method 5 is awkward, however. For some applications branching to Method 2 and 3 for odd and even log 2N will be preferable to Method 5.

Processor cycles are further reduced in FFTs with an odd log 2N input array with Method 2. Method 2 considers (log 2N−1)/2 LSBs and (log 2N−1)/2 MSBs for odd log 2N to define sets A, B, and C. Also, the (log 2N+1)/2 th middle bit of each binary array element is considered. Method 2 defines set A as the union of the set of elements that have z=1 and LSBs<bit_rev (MSBs) with the set of elements that have z=0 and LSBs>bit_rev (MSBs). Sets A and B inequality criterion are reversed according to whether the middle bit value is one or zero. While Method 2 reduces processor cycles over Method 1, Method 2 also has a 2^(log 2N) alignment requirement not found in Method 1. To perform Method 2, three moves are implemented as defined in Table V. The third move combines the operations of the first two moves.

TABLE V

Moves for Method 2

| Move 1 | Move 2 | Move 3 |
|---|---|---|
| AR1=AR1−I0B | AR1=AR1−1 | AR1=AR1−1−I0B |
| AR2=AR2−1 | AR2=AR2−I0B | AR2=AR2−I0B−1 |

Method 2 is implemented with the following steps:

```
Initialize AR1=S_in+1, AR2=S_in+I0.
Iterate from k=1 to 2^(log2N-2)-2^Q in steps of 1
    Move 1
    Move 2
End of k loop
Move 1
Iterate from j=1 to (2^Q)-2 in steps of 1
    Move 3
End of j loop
```

Therefore, to implement the operations of Method 2, address registers AR1=S_in+1, AR2=S_in+I0 are initialized. Method 2 iterates from k=1 to 2^(log 2N−2)−2^Q in steps of 1; performs Move 1; performs Move 2; and ends the k loop. The Method 2 then performs Move 1; iterates from j=1 to (2^Q)−2 in steps of 1; performs Move 3, and then ends the j loop. The values of AR1, AR2 after initialization and all moves define the Method 2 address pair sequence.

Processor cycles may be further reduced over Method 1 for input arrays of an even log 2N size by implementing Method 3. Method 3 considers log 2N/2 LSBs and MSBs to define the sets A, B, and C for input array elements. Method 3 defines input array element set A by those addresses that have address LSBs>bit_rev(address MSBs). Method 3 may or may not reduce processor cycles over Method 1, depending on the processor. Method 3 also has a 2^(log 2N) alignment requirement not found in Method 1. To perform Method 3, four moves are implemented as defined in Table VI.

TABLE VI

Moves for Method 3

| Move 1 | Move 2 | Move 3 | Move 4 |
|---|---|---|---|
| AR1=AR1+1 | AR1=AR1+I0B | AR1=AR3 | AR3=AR3+2 |
| AR2=AR2+I0B | AR2=AR2+1 | AR2=AR4 | AR4=AR4+I5B |

Method 3 is implemented with the following steps:

```
Initialize AR3=S_in+1, AR4=S_in+I0
Iterate for k=(2^Q)-2 to 0 in steps of -2
    Move 3
    Move 4
    Iterate for j=1 to k in steps of 1
        Move 1
        Move 2
    End of j loop
End of k loop
```

The sequence of address pairs generated by Method 3 is defined by the AR1, AR2 values after initialization and after all moves except Move 4.

Method 4 is similar to Method 1 in that it can be implemented for both odd and even log 2N input arrays. Differences between the two include implementation for different processor capabilities and how the methods define input sets of array elements. Method 4 may operate on processors with only one address increment register, whereas Method 1 requires more than one such register. Method 4 considers LSBs and MSBs from Q bits to define the sets A, B, and C for input array elements and defines input array element set A by those addresses that have address LSBs>bit_rev(address MSBs). However, Method 4 does not reduce the alignment requirement.

To perform Method 4, three moves are implemented as defined in Table VII.

TABLE VII

Moves for Method 4

| Move 1 | Move 2 | Move 3 |
|---|---|---|
| AR1=AR1+I0B | AR1=AR3 | AR3=AR3+1 |
| AR2=AR2+1 | AR2=AR4 | AR4=AR4+I0B |

To implement the operations of Method 4, the following steps are performed:

```
Initialize AR3=S_in, AR4=S_in.
Iterate for m=0 to m=R in steps of 1
    Iterate from k=1 to (2^Q)-1 in steps of 1
        Move 3
        Move 2
        Iterate from j=1 to k-1 in steps of 1
            Move 1
        End of j loop
    End of k loop
    Move 3
End of m loop
```

The address pair sequence for Method 1 is defined by the AR1, AR2 values after Moves 1 and 2. Similarly, the address pair sequence for Method 4 is also defined by the AR1, AR2 values after Moves 1 and 2.

Method 5 extends Method 3 to work for odd log 2N. Referring to FIG. 1, processor cycles may be further reduced over Method 1 for input arrays of an odd log 2N size by implementing Method 5. To perform Method 5, five moves are implemented as defined in Table VIII.

TABLE VIII

Moves for Method 5

| Move 1 | Move 2 | Move 3 | Move 4 | Move 5 |
|---|---|---|---|---|
| AR1=AR1+1 | AR1=AR1+I0B | AR1=AR3 | AR3=AR3+2 | AR1=AR1+1+I0B |
| AR2=AR2+I0B | AR2=AR2+1 | AR2=AR4 | AR4=AR4+I5B | AR2=AR2+1+I0B |

To implement the operations of Method 5, the following steps are performed:

```
Initialize AR3=S_in+1, AR4=S_in+I0
If(log2N>1)
count=2^Q-1
Iterate for k=(2^Q)-2 to 2 in steps of -2
    Move 3
    Move 4
    If(R==0) count=k; End of if;
    Iterate for j=1 to count in steps of 1
        Move 1
        Move 2
    End of j loop
    If(R==1) Move 1 End of if;
End of k loop
Move 3
If(R==1)
    Iterate for j=1 to count in steps of 1
        Move 5
    End of j loop
End of if
```

The sequence of address pairs generated by Method 5 is defined by the AR1, AR2 values after initialization and after all moves except Move 4.

All the IPBR Methods of the present invention can be modified by replacing part or all of the address pair sequence with a "topologically similar" sequence. Variations of the IPBR Methods include 1) reversing the order of the original subsequences, 2) x and y axis inversions of the original sequence, and 3) replacing an (A,B) address pair with (B,A) address pair for arbitrary numbers of terms in sequences. By reversing the order of alternating subsequences in Method 1, 3 and 4, Method 1m, 3m and 4m remove the need for auxiliary address registers AR3 and AR4. Thus every sequential "move" advances from the prior address pair location without periodically resetting to stored AR3, AR4 values. Relative to the unmodified methods, Method 1m, 3m and 4m may reduce some cycles (depending on the processor) but will add to program memory. An advantage of Method 1m, 3m and 4m is that they require less address registers to implement. Method 2m does not alter the cycle count, but is exemplary of an x and y axis inversion. Method 2m "inverts" the entire address pair sequence of Method 2.

The address generation scheme for Method 2 uses an address increment of $AR0=2^{\wedge}(\log 2N-1)$. One can modify Method 2 first by changing the starting address pair from $AR1=1$ and $AR2=AR0$ to the same address pair after x and y axis inversion, $AR1=2*(AR0-1)$ and $AR2=AR0-1$. Next, change the sign of all address increments in the address generation scheme. For the original Method 2 all increments (linear and bit reversed) are subtracted; for Method 2m, all increments are added. This results in a valid IPBR address generator for all odd log 2N, and the N=32 address pair sequence is given by FIG. 12.

Note the described modification of Method 2 generates a sequence of address pairs that is topologically similar to the original Method 2 shown previously in FIG. 10. The data along both the x and y axis has been inverted. Placing an upside down graph of FIG. 12 on top of FIG. 10 results in a match. Method 2 is preferable to Method 2m only because of a simpler initialization of the address pair sequence. This invention is inclusive of topologically equivalent address generation schemes and all address generation schemes that vary in some simple or obvious manner from Method 1, 2, 3, and 4. Method 1m keeps the same subsequences shown on horizontal and vertical lines in FIG. 5 for Method 1, but connects these subsequences in a different way.

A similar modification could be performed on Method 4. For variety, however, Method 4m is formed by reconnecting the horizontal and vertical lines in a different manner. Note that none of the alternatives given in Table IV are satisfied by the entire Method 4m address pair sequence given in FIG. 13. However, all of the individual sub-sequences do satisfy Table IV.

Figure 13:
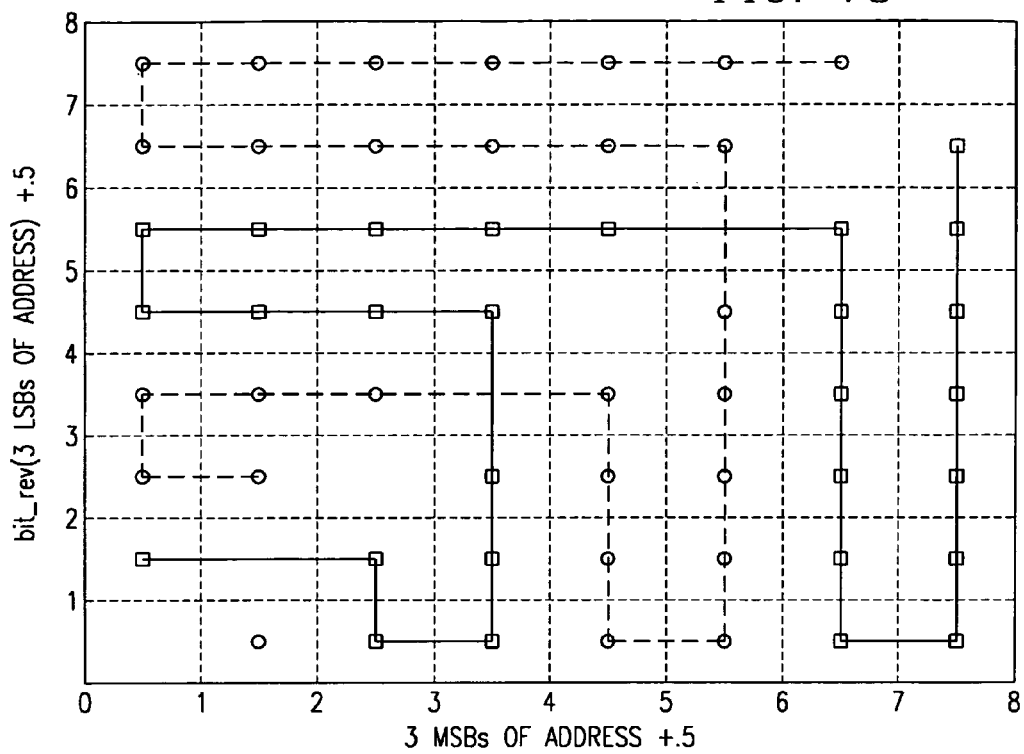
FIG. 13 is an illustrative graph of Method 1m IPBR address generation.
Figure 14:
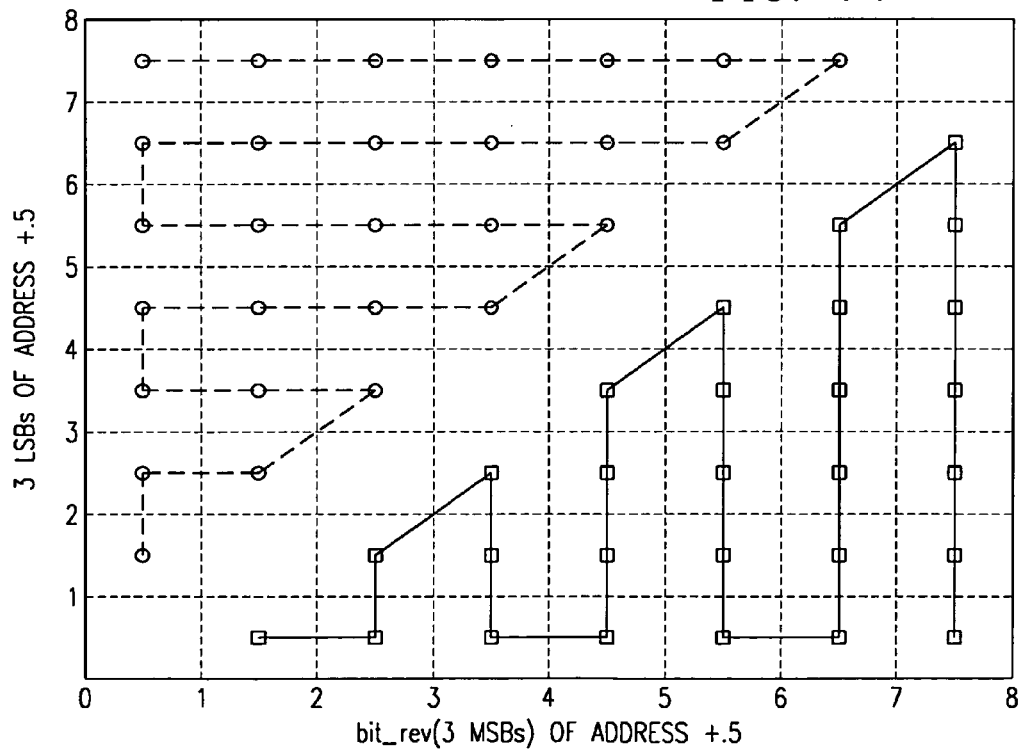
FIG. 14 is an illustrative graph of Method 4m IPBR address generation.

Any method can be altered by interchanging the order of the first and second addresses of an address pair. Such exchanges may be favorable for reducing program code or cycles but should not be thought of as producing a different address pair generator that is not included in this invention. An example of two address pair generators that give an identical address pair sequence, and vary only in the order of the first and second address for an arbitrary number of address pairs, can be illustrated by plots of Method 1m (FIG. 13) and Method 4m (FIG. 14). In FIG. 13, changing the bit reversed axis from the y-axis to the x-axis results in a sequence of address pairs that is identical to that of FIG. 14. The only difference is that in alternating subsequences, the choice of first and second address is exchanged. Such an exchange does not result in a new address pair, and thus a new IPBR address pair generator, outside the scope of the present invention.

To perform IPBR, modified Method 1m uses eight "moves" to generate a new AR1, AR2 address pair as defined in Table IX. For moves seven and eight, a new bit reversed pair of address increments is defined: $I6=2^{\wedge}(Q-2)$ and $I7=2^{\wedge}(\log 2N-Q+1)$.

TABLE IX

Moves for Method 1m

| Move 1 | Move 2 | Move 3 | Move 4 | Move 5 | Move 6 | Move 7 | Move 8 |
|---|---|---|---|---|---|---|---|
| AR1+=I1B | AR1+=I2 | AR1-=I1B | AR1-=I2 | AR1+=I3 | AR1+=I4B | AR1+=I6B | AR1+=I7 |
| AR2+=I2 | AR2+=I1B | AR2-=I2 | AR2-=I1B | AR2+=I4B | AR2+=I3 | AR2+=I7 | AR2+=I6B |

Method 1m is implemented with the following steps:

```
Initialize AR1=S_in+I3, AR2=S_in+I4.
Stop=(R+1)*((2^Q)-2)-1
k=-1
while(2^Q>1)
  k=k+(R+1)
  Iterate from j=1 to k in steps of 1    Move 1    End of j loop
  Move 7
  If(log2N<4) go to Exit
  k=k+(R+1)
  Iterate from j=1 to k in steps of 1    Move 4    End of j loop
  Move 6
  k=k+(R+1)
  Iterate from j=1 to k in steps of 1    Move 2    End of j loop
  if(k>stop) go to Exit
  Move 8
  k=k+(R+1)
  Iterate from j=1 to k in steps of 1    Move 3    End of j loop
  Move 5
End of while loop
Exit:
```

The values of AR1, AR2 after initialization and all moves define the Method 1m address pair sequence.

To perform Method 2m, three moves are implemented as defined in Table X. The third move combines the operations of the first two moves. Relative to the unmodified Method 2, Method 2m is an example of x and y axis inversion.

TABLE X

Moves for Method 2m

| Move 1 | Move 2 | Move 3 |
|---|---|---|
| AR1=AR1+I0B | AR1=AR1+1 | AR1=AR1+1+I0B |
| AR2=AR2+1 | AR2=AR2+I0B | AR2=AR2+I0B+1 |

Method 2m is implemented with the following steps:

```
Initialize AR1=S_in-2+2^log2N, AR2=S_in-1+2^(log2N-1).
Iterate from k=1 to 2^(log2N-2)-2^Q in steps of 1
    Move 1
```

-continued

```
    Move 2
End of k loop
Move 1
Iterate from j=1 to (2^Q)-2 in steps of 1
    Move 3
End of j loop
```

Similar to Method 3, Method 3m is implemented to reduce processor cycles for input arrays of even log 2N size. Method 3m requires only two address registers to operate. To perform Method 3m, six moves are implemented as defined in Table XI. In the Table XI, ARx+=Iy represents ARx=ARx+Iy.

TABLE XI

Moves for Method 3m

| Move 1 | Move 2 | Move 3 | Move 4 | Move 5 | Move 6 |
|---|---|---|---|---|---|
| AR1+=1 | AR1+=I0B | AR1-=1 | AR1-=I0B | AR1+=2 | AR1-=I5B |
| AR2+=I0B | AR2+=1 | AR2-=I0B | AR2-=1 | AR2+=I5B | AR2-=2 |

Method 3m is implemented with the following steps:

```
Initialize AR1=-1, AR2=-1+2^log2N
If (log2N>2)
    Iterate for k=(2^Q)-2 to 0 in steps of -4
        Move 5
        Iterate for j=1 to k in steps of 1
            Move 1
            Move 2
        End of j loop
        Move 6
```

-continued

```
        Iterate for j=1 to k-2 in steps of 1
            Move 4
            Move 3
        End of j loop
    End of k loop
End of if
```

Excluding initialization, all values of AR1, AR2 after moves define the Method 3m address pair sequence.

Method 4m illustrates a scheme different from Method 1m for reconnecting subsequences of address pairs. To perform Method 4m, five moves are implemented as defined in Table XII. For processors with only one address increment register, note after two Move 1's the final resulting AR1, AR2 changes are equivalent to Move 5.

TABLE XII

Moves for Method 4m

| Move 1 | Move 2 | Move 3 | Move 4 | Move 5 |
|---|---|---|---|---|
| AR1=AR1+1 | AR1=AR1+I0B | AR1=AR1+1+I0B | AR1=AR1-I0B | AR1=AR1+2 |
| AR2=AR2+I0B | AR2=AR2+1 | AR2=AR2+I0B+1 | AR1=AR1-1 | AR2=AR2+I5 |

Method 4m is implemented with the following steps:

```
Initialize AR1=S_in+1, AR2=S_in+I0.
Iterate from m=0 to R in steps of 1
    Iterate from k=1 to (2^Q) -2 in steps of 2
        Move 1
        Iterate from j=1 to k in steps of 1
            Move 2
        End of j loop
        Move 3
        Iterate from j=1 to k+1 in steps of 1
            Move 4
        End of j loop
    End of k loop
    Move 5
End of m loop
```

The values of AR1, AR2 after initialization and all moves define the Method 4m address pair sequence.

In Methods 1 and 4, for each iteration that an address pair is advanced, typically only one address is advanced with a bit reversed increment. To apply a bit reversed increment to an address register, ARx, in the absence of an alignment restriction, one approach is as follows:

1) Subtract the buffers start address from ARx. (After subtraction, the effective start address reference is zero, and thus the alignment restriction is satisfied);

2) Perform the bit reversed incrementation on ARx; and
3) Add the start address back to ARx.

For the above approach, ideally an address increment register can be reserved for the start address that is subtracted and added to ARx. On the TI C54x, only one address increment register, AR0, is available for use by the IPBR Methods 1 through 4 presented herein. An alternative procedure is to create a "shadow" address register, ARy, for each address register used by the IPBR method. Keep ARx=ARy+start address, so the shadow register references a zero start address and satisfies the alignment restriction. For each iteration the address pair is advanced, the address that is bit reversed is incremented according to the following steps:

1) If ARy is not already up to date, force ARy=ARx−start address;
2) Perform the bit reverse incrementation on ARy; and
3) Add the start address and store in ARx, i.e., ARx=ARy+start address.

If the inner loop always bit reverses increments for the same address of the address pair, then step one can be removed from the inner loop.

An alternative embodiment of the present invention generates addresses using out of place bit reversal (OOPBR) to reduce cycles for processors that do not support bit reversed address register incrementation and consequently require many cycles to generate a bit reversed address. The conventional OOPBR approach is to generate one address pair per data move. With the present invention, about half as many bit reversed address offsets are generated by using bit reversed offsets twice. First, one of this invention's IPBR methods is used to generate address pair offsets [AR1, bit_rev(AR1)] as if S_in=0. The OOPBR algorithm copies data from the contents referenced by S_in+AR1 into S_out+bit_rev(AR1) and copies data referenced by S_in+bit_rev(AR1) into S_out+AR1. Finally, a second address generator is used to generate all self-reversed offsets, and for each self reversed offset only one data transfer is made. This OOPBR method removes the start address offset from the address pair sequence generated, and consequently this OOPBR method need not impose any alignment constraints on the input or output buffer.

To implement the OOPBR Method, IPBR Method 1 is extended for OOPBR applications. Address pairs AR3 and AR4 are initialized to zero instead of S_in, because for OOPBR, relative address offsets are generated, not actual addresses. Beyond the moves for the chosen IPBR method, three additional moves are needed. These additional moves only affect one address register. To perform the OOPBR Method, six moves are implemented as defined in Table XIII.

To implement the operations of the OOPBR Method, the following steps are performed:

Initialize AR3=0, AR4=0.
Iterate from k=(R+1) to (R+1)*2^(Q−1) in steps of (R+1)
    Move 3
    Move 2
    Iterate from j=1 to k−1 in steps of 1
        Move 1
    End of j loop
End of k loop For all of the above moves (that affect AR1, AR2) transfer data from address S_in+AR1 to S_out+AR2, and transfer data from S_in+AR2 to S_out+AR1. When it is costly in cycles to calculate the result of bit reversed address incrementation, this is helpful because two data transfers are made for each bit reversed address computation. Note that making the two indicated data transfers for the address pair sequence given above will not complete the OOPBR operation because all the self-reversed addresses are omitted.

The operations of the OOPBR Method are continued with the following steps:

Initialize AR3=0
Iterate for k=0 to R in steps of 1
    Move OOPBR.2
    Move OOPBR.3
    Iterate for j=1 to (2^Q)−1
        Move OOPBR.1
    End of j loop
End of k loop For all of the preceding moves for OOPBR that affect AR1, only transfer data from S_in+AR1 into S_out+AR1.

The present invention can be efficiently implemented even when data elements are represented by multiple contiguous words. For each of the methods disclosed, the initial address pair(s) and all increment registers are multiplied by $2^M$ when data elements are represented by $2^M$ contiguous words. For a linear increment of one, however, scaling up by $2^M$ is normally not needed as demonstrated below. Also, methods for dealing with the lowest M bits of the address that needs a bit reversed increment are described below. For some FFTs, each sequential data element may require two or four words of memory. For example, double precision complex FFT data can be in the format, R_MSW(1), R_LSW(1), I_MSW(1), I_LSW(1), R_MSW(2), R_LSW(2), I_MSW(2), I_LSW(2), . . . for R_MSW=signed real most significant word; R_LSW=unsigned real least significant word; I_MSW=signed imaginary most significant word; I_LSW=unsigned imaginary least significant word.

TABLE XIII

Moves for OOBPR Method

| Move 1 | Move 2 | Move 3 | Move OOPBR.1 | Move OOPBR.2 | Move OOPBR.3 |
|---|---|---|---|---|---|
| AR1 = AR1 + I1B | AR1 = AR3 | AR3 = AR3 + I3 | AR1 = AR1 + 1 + I0B | AR1 = AR3 | AR3 = AR3 + I2 |
| AR2 = AR2 + I2 | AR2 = AR4 | AR4 = AR4 + I4B | | | |

Assume for a particular IPBR swap and move, the goal is to advance AR1 linearly to the next element and advance AR2 bit reversed. Table XIV illustrates IPBR processing of single and four word elements.

TABLE XIV

IPBR Processing of Single and Four Word Elements

| Single precision real M=0<br>1 word of contiguous memory per element in array | Double precision complex M=2<br>4 words of contiguous memory per array element |
|---|---|
| AR0 = 2^(log2N−1); address increment<br>Start of Loop<br>Swap (AR1, AR2) data, AR1=AR1+1<br>AR2=bitrev_add(AR2, AR0)<br>End of Loop | AR0 = 2 + 4*2^(log2N−1)<br>Start of Loop<br>Swap (AR1, AR2) data, AR1=AR1+1, AR2=AR2+1<br>Swap (AR1, AR2) data, AR1=AR1+1, AR2=AR2+1<br>Swap (AR1, AR2) data, AR1=AR1+1, AR2=AR2+1<br>Swap (AR1, AR2) data, AR1=AR1+1<br>AR2=bitrev_add(AR2, AR0)<br>End of Loop |

For the exemplary double precision complex FFT, Table XIV adds two to the bit-reversed increment, AR0, relative to the single precision real case. This procedure avoids using another instruction to subtract three from AR2. Adding two to the bit-reversed increment for four words of contiguous memory clears an offset of three, since in bit reversed addition 3+2B=0. An alternative approach is to treat alternating sequential swaps differently. The first data swap lets the two least significant bits advance to three by advancing from the R_MSW to the I_MSW. The second swap starts by swapping I_MSW and advances backwards to swap the R_MSW data last.

To estimate the number of cycles required to implement the methods of the present invention on a TI C54x processor, the number of address pairs generated is multiplied by the cycles required to generate a new address pair and perform (or decline to perform) an exchange of data referenced by the address pair. The cycle estimates presented in Table XV ignore the penalty for a limited number of outer loops when loops are nested. These results demonstrate that the new IPBR methods are competitive with OOPBR. IPBR methods reduce the number of cycles by more than 80% over the conventional method, in most cases. Cycles per address pair are reduced from 14 or 12 cycles down to 4 or 3 cycles and the number of address pairs is reduced in half. The modified methods only vary from the corresponding un-modified method in that their preferred implementation use only two address registers.

TABLE XV

Requirements of the OOPBR and IPBR Methods

| Method of single word data element bit reversal for an array with length equal to a power of 2. | TI C54x Cycles per address pair[1] | Number of iterations address pairs are generated | Alignment Constraint Array start address must be a multiple of | Nested loops used? | Number of Address registers needed | Inner loop address increment registers needed |
|---|---|---|---|---|---|---|
| OOPBR Conventional Method[1] | 3 | 2^(log2N−1) | 2^log2N | No | 2 | 1 |
| IPBR Conventional Method[2] | 14 or 12 | 2^(log2N) | 2^log2N | No | 2 | 1 |
| Method 1 (even log2N)[3] | 4 | 2^(log2N−1) − 2^(log2N/2) | 2^(log2N/2 − 1) | Yes | 4 | 2 |
| Method 1 (odd log2N) | 3 | 2^(log2N−1) − 2^(log2N/2 + 1/2) | 2^((log2N−1)/2) | Yes | 4 | 1 |
| Method 2 (odd log2N) | 3 | 2^(log2N−1) − 2^(log2N/2 + 1/2) | 2^log2N | No | 2 | 1 |
| Method 3 (even log2N) | 3 | 2^(log2N−1) − 2^(log2N/2) | 2^log2N | Yes | 4 | 1 |
| Method 4 & 5 (even log2N) | 3 | 2^(log2N−1) − 2^(log2N/2 + 1/2) | 2^log2N | Yes | 4 | 1 |
| Method 4 & 5 (odd log2N) | 3 | 2^(log2N−1) − 2^(log2N/2) | 2^log2N | Yes | 4 | 1 |

Referring to the Table XV footnotes:

1) For relocatable data memory. A C54x OOPBR optimized loop processes two bit reversed address pairs per iteration for single word data elements, i.e.; DLD*AR1+, Areg; STH Areg,*AR2+0B; STL Areg,*AR2+0B. For applications designating a fixed, non-relocatable output array location in data memory, a faster OOPBR C54x implementation exists that cannot be extended for the case when each data elements is represented by multiple contiguous words. This would invoke 2^(log 2N) iterations of a single instruction loop using the instruction, MVDK *AR1+0B, #OUT_ADDR. This C54x instruction requires one cycle in single instruction loops.

2) For each address pair generated, 14 cycles are required if swap is executed, 12 if swap is omitted.

3) A one cycle penalty in the inner loop is due to the TI C54x having only one address increment register. Only 3 cycles are required on TI processors with more than one address increment register. To swap data from address register ARx and ARy, while advancing ARx by Ix and ARy by Iy bit reversed, use the three TI DSP instructions LD AR2, Areg; MVDD AR2+x%,*AR1; STL Areg, * AR1+yB.

However, for the C54x only one address increment register is available so x=y=0. For even log 2N the required address increments are a factor of 2 apart, so an extra MAR AR2+0 instruction is required as well as separate hard coded loops to process even and odd log 2N cases. If the even log 2N one cycle penalty is unacceptable, a different method can be used for the even log 2N case. In that event, Method 1 is only being used for odd log 2N, and might be replaced by the more efficient Method 2.

The IPBR cycle counts are competitive with OOPBR in all cases. TI C54x cycle counts for the entire IPBR implementation are given in Table XVI for array sizes of 1024 and 2048. For the TI C54X IPBR implementations reported on in this table, outer loop counters were hard coded for one value of log 2N. Programming general formulas (executed once) for any log 2N value would add a small amount of cycles to these results. For the TI C54X, the modified methods did not reduce cycles, as the increase in nested loops and branching outweighed removing (AR3, AR4) address pair manipulations. The Method 3 cycles given are only ten percent more than the minimum possible for OOPBR. Method 2 is more efficient than OOPBR. Using the methods of the present invention, the results illustrate that a significant reduction in cycles relative to conventional IPBR is achieved.

TABLE XVI

TI C54x Cycle Requirements

| Method to place array in bit reversed order for single word data elements (M = 0) | C54x cycles for log2N = 10 array size N = 1024 | C54x cycles for log2N = 11 array size N = 2048 |
| --- | --- | --- |
| OOPBR Conventional Method for relocatable data memory. (cycles of inner loop only given here, using 3*2^(log2N − 1) | 1,536 + overhead | 3,072 + overhead |
| IPBR Conventional Method | 11,242 | 22,474 |
| IPBR Method 1 | 2,367 | 3,390 |
| IPBR Method 1 no alignment constraint | 4,452 | 7,458 |
| IPBR Method 1 m | 2,520 | 3,820 |
| IPBR Method 2 & 2 m (odd log2N only) | | 3,052 |
| IPBR Method 3 (even log2N only) | 1,694 | |
| IPBR Method 4 | 1,840 | 3,674 |

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for reordering the elements of a $2^{(\log 2N)}$ length input array in bit reversed order in a computer processor for a Fast Fourier Transform, comprising:
   generating a sequence of address pairs in said processor from said input array,
   wherein each of said address pairs is generated once, and said generating generates no self-reversed addresses of said input array into said sequence.

2. The method of claim 1, wherein said generating comprises interchanging an order of at least one of a first address of each address pair and a second address of each address pair.

3. The method of claim 1, wherein the generating comprises generating at least one of said address pairs in one or more address increment registers.

4. The method of claim 1, further comprising:
   dividing said array element addresses into a first set of element addresses in the array that are not self-reversible, a second set of element addresses that are bit-reversed element addresses of the first set, and a third set of element addresses that contains all self-reversed addresses from the array element addresses,
   wherein the dividing analyzes Q most significant bits and least significant bits where Q is the truncated integral quotient of log 2N/2 for the array of length $2^{(\log 2N)}$.

5. The method of claim 1, further comprising:
   plotting a plurality of first and second addresses of sequential address pair values as a graphical representation having a first axis of coordinates that represents most significant bits and a second axis of coordinates that represents least significant bits for each address of said address pair, and
   wherein each coordinate in the graphical representation represents one of a first address and a second address of said elements of said input array, and
   wherein each second address is a bit reversal of each respective first address;
   defining a path in the graphical representation for processing the first addresses and the second addresses that systematically processes through a plurality of said coordinates.

6. The method of claim 1, wherein the generating further comprises:
   generating said sequence of address pairs using out of place bit reversal by removing a start address from each generated address pair sequence;
   self-reversing the address pairs with removed start addresses; and
   transferring data only once for each self reversed address pair.

7. The method of claim 1, wherein the dividing comprises forming the first set of the array element addresses having values of bit reversed Q least significant bits greater than values of Q most significant bits,
   forming the second set of the array element addresses having values of bit reversed Q least significant bits less than values of Q most significant bits, and
   forming the third set of the array element addresses having values of bit reversed Q least significant bits equal to values of Q most significant bits.

8. The method of claim 1, wherein the dividing forms the first set from the array element addresses having values of Q least significant bits greater than values of their bit reversed Q most significant bits,
   forms the second set from the array element addresses having values of bit reversed Q least significant bits less than values of their bit reversed Q most significant bits, and
   forms the third set of the array element addresses having values of bit reversed Q least significant bits equal to values of their bit reversed Q most significant bits.

9. the method of claim 1, wherein if the middle bit is zero in the address pairs, the dividing comprises forming the first set of the array element addresses having values of bit reversed Q least significant bits greater than values of Q most significant bits, the second set consists of the array element addresses having values of bit reversed Q least significant bits less than values of Q most significant bits, and the third set consists of the array element addresses having values of bit reversed Q least significant bits equal to values of Q most significant bits, and wherein if the middle bit is one in the address pairs, the dividing comprises forming the first set of the array element addresses having values of bit reversed Q least significant bits less than values of Q most significant bits, the second set consists of the array element addresses having values of bit reversed Q least significant bits greater than values of Q most significant, and the third set consists of the array element addresses having values of bit reversed Q least significant bits equal to values of Q most significant bits.

10. A method for reordering the elements of a 2^(log 2N) length input array in bit reversed order in a computer processor for a Fast Fourier Transform, comprising:

dividing the array element addresses into a first set of element addresses in the array that are not self-reversible, a second set of element addresses that are bit-reversed element addresses of the first set, and a third set of element addresses that contains all self-reversed addresses from the array element addresses;

processing the first set of element addresses to define a first address of each address pair;

defining a second address of each address pair using a complimentary bit reversed increment; and generating a sequence of address pairs from the first set and the second set of element addresses, wherein each address pair is generated only once, and no said self-reversed address appears in said generated sequence of address pairs.

11. The method of claim 10, wherein the generating further comprises:

interchanging the order of at least one of the first addresses and the second addresses of said address pairs.

12. The method of claim 10, wherein the generating comprises performing address generation by advancing each said address pair with the steps of:

storing a primary or a secondary bit reversed address pair;

performing a discrete set of moves to advance each of said address pairs, wherein each pair remains mutually bit reversed after each move; and controlling the order of said moves, wherein said sequence of address pairs are formed from resultant values of said primary address pair after an application of each move to said primary address pair.

13. The method of claim 10, wherein the dividing comprises forming the first set of the array element addresses having values of bit reversed Q least significant bits greater than values of Q most significant bits, forming said second set of the array element addresses having values of bit reversed Q least significant bits less than values of Q most significant bits, and forming the third set of the array element addresses having values of bit reversed Q least significant bits equal to values of Q most significant bits.

14. The method of claim 10, wherein if the middle bit is zero in said address pairs, the dividing comprises forming the first set of the array element addresses having values of bit reversed Q least significant bits greater than values of Q most significant bits, the second set consists of the array element addresses having values of bit reversed Q least significant bits less than values of Q most significant, and the third set consists of the array element addresses having values of bit reversed Q least significant bits equal to values of Q most significant bits, and wherein if the middle bit is one in the address pairs, the dividing comprises forming the first set of the array element addresses having values of bit reversed Q least significant bits less than values of Q most significant bits, the second set consists of the array element addresses having values of bit reversed Q least significant bits greater than values of Q most significant, and the third set consists of the array element addresses having values of bit reversed Q least significant bits equal to values of Q most significant bits.

15. A method for reordering the elements of a 2^(log 2N) length input array in bit reversed order in a computer processor for a Fast Fourier Transform, comprising:

generating a sequence of address pairs from said input array such that each of said address pairs is generated once, wherein the generating generates no self-reversed addresses of said input array into said sequence, and performs an in-place mapping of said input array elements in bit-reversed order by exchanging the array elements referenced by the address pairs in the sequence.

16. The method of claim 15, wherein said generating comprises reversing the order of subsequences.

17. The method of claim 15, further comprising:

dividing said array element addresses into a first set of element addresses in said array that are not self-reversible, a second set of element addresses that are bit-reversed element addresses of the first set, and a third set of element addresses that contains all self-reversed addresses from the array element addresses, wherein the dividing analyzes Q most significant bits and least significant bits where Q is the truncated integral quotient of log 2N/2 for the array of length 2^(log 2N).

18. The method of claim 17, further comprising:

plotting said sequence generation as a graphical representation having a first axis of coordinates that represents the most significant bits and a second axis of coordinates that represents least significant bits for each address of said address pairs.

wherein the plotting comprises forming, when the log 2N array is even, the second axis as bit reversed Q least significant bits and the first axis as Q most significant bits from the address pairs.

19. The method of claim 17, wherein the dividing comprises forming the first set of the array element addresses having values of bit reversed Q least significant bits greater than Q most significant bits, forming the second set of the array element addresses having values of bit reversed Q least significant bits less than values of Q most significant bits, and forming the third set of the array element addresses having values of bit reversed Q least significant bits equal to values of Q most significant bits.

20. The method of claim 17, further comprising:

plotting said sequence generation as a graphical representation having a first axis of coordinates that represents the most significant bits and a second axis of coordinates that represents least significant bits for each address of said address pair, wherein the plotting comprises forming, when the log 2N array is even the second axis as Q least significant bits and the first axis as bit reversed Q most significant bits from the address pairs.

21. The method of claim 17, wherein the dividing comprises forming the first set of the array element addresses having values of Q least significant bits greater than values of bit reversed Q most significant bits, forming the second set of the array element addresses having values of Q least significant bits less than values of bit reversed Q most significant bits, and forming the third set of the array element addresses having values of Q least significant bits equal to values of bit reversed Q most significant bits.

22. The method of claim 17, further comprising:

plotting said sequence generation as a graphical representation having a first axis of coordinates that represents the most significant bits and a second axis of coordinates that represents least significant bits for each address of said address pair, and wherein the plotting comprises forming, when the log 2N array is odd, the second axis as bit reversed Q+1 least significant bits and the first axis as Q most significant bits from said address pairs.

23. The method of claim 17, wherein if the middle bit is zero in the address pairs, the dividing comprises forming the first set of the array element addresses having values of bit reversed Q least significant bits greater than values of Q most significant bits, the second set consists of the array element addresses having values of bit reversed Q least significant bits less than values of Q most significant, and the third set consists of the array element addresses having values of bit reversed Q least significant bits equal to values of Q most significant bits, and wherein if the middle bit is one in the address pairs, the dividing comprises forming the first set of the array element addresses having values of bit reversed Q least significant bits less than values of Q most significant bits, the second set consists of the array element addresses having values of bit reversed Q least significant bits greater than values of Q most significant, and the third set consists of the array element addresses having values of bit reversed Q least significant bits equal to values of Q most significant bits.

24. The method of claim 17, further comprising:

plotting said sequence generation as a graphical representation having a first axis of coordinates that represents the most significant bits and a second axis of coordinates that represents least significant bits for each address of said address pair, and wherein the plotting comprises forming, when the log 2N array is odd, the second axis as Q+1 least significant bits and forming the first axis as bit reversed Q most significant bits for said address pairs.

25. The method of claim 17, wherein the dividing is performed if the middle bit is zero in the address pairs, and, if the middle bit in the address pairs is one, the dividing forms the first set from the array element addresses having values of Q least significant bits less than values of their bit reversed Q most significant bits, and forms the second set from the array element addresses having values of bit reversed Q least significant bits less than values of their bit reversed Q most significant bits.

26. The method of claim 17, further comprising:

plotting said sequence generation into a graphical representation having a first axis of coordinates that represents the most significant bits and a second axis of coordinates that represents least significant bits for each address of said address pair, and wherein the plotting comprises forming, when the log 2N array is odd, the second axis as bit reversed Q least significant bits and the first axis as Q+1 most significant bits from the address pairs.

27. The method of claim 17, further comprising:

plotting said sequence generation into a graphical representation having a first axis of coordinates that represents the most significant bits and a second axis of coordinates that represents least significant bits for each address of said address pair, and wherein the plotting comprises forming, when said log 2N array is odd, the second axis as Q least significant bits and the first axis as bit reversed Q+1 most significant bits for the address pairs.

28. A method for reordering the elements of a 2^(log 2N) length input array in bit reversed order to generate address pairs using a Fast Fourier Transform in a computer system processor, comprising:

organizing said array element addresses into a first set of element addresses in said array that are not self-reversible, a second set of element addresses that are bit-reversed element addresses of the first set, and a third set of element addresses that contains all self-reversed addresses from said array element addresses;

advancing through processing said first set of element addresses to define a first address of each address pair;

defining a second address of each address pair using a complimentary bit reversed increment;

generating a sequence of address pairs from said first set and said second set of element addresses, wherein each address pair is generated only once, no said self-reversed address appears in said generated sequence of address pairs.

29. The method of claim 28, further comprising:

performing the method for reordering the elements using out of place bit reversal.

* * * * *